(12) United States Patent
Boyd et al.

(10) Patent No.: US 7,912,988 B2
(45) Date of Patent: *Mar. 22, 2011

(54) RECEIVE QUEUE DEVICE WITH EFFICIENT QUEUE FLOW CONTROL, SEGMENT PLACEMENT AND VIRTUALIZATION MECHANISMS

(75) Inventors: William Todd Boyd, Poughkeepsie, NY (US); Jean L. Calvignac, Cary, NC (US); Chih-Jen Chang, Apex, NC (US); Douglas J. Joseph, Danbury, CT (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/487,265

(22) Filed: Jul. 14, 2006

(65) Prior Publication Data

US 2006/0259644 A1 Nov. 16, 2006

Related U.S. Application Data

(62) Division of application No. 10/235,672, filed on Sep. 5, 2002, now abandoned.

(51) Int. Cl.
  *G06F 15/16* (2006.01)
(52) U.S. Cl. .................................. 709/250; 709/230
(58) Field of Classification Search .............. 709/230, 709/250
  See application file for complete search history.

(56) References Cited

U.S. PATENT DOCUMENTS

| | | | |
|---|---|---|---|
| 6,034,963 A | 3/2000 | Minami et al. | |
| 6,249,883 B1 | 6/2001 | Cassidy et al. | |
| 6,725,284 B2 | 4/2004 | Arndt et al. | |
| 6,990,481 B1 | 1/2006 | Coile | |
| 2002/0156927 A1* | 10/2002 | Boucher et al. | 709/250 |
| 2003/0014544 A1* | 1/2003 | Pettey | 709/249 |
| 2003/0018927 A1 | 1/2003 | Gadir et al. | |
| 2003/0046330 A1 | 3/2003 | Hayes | |

(Continued)

OTHER PUBLICATIONS

U.S. Appl. No. 11/418,606, filed May 5, 2006, Boyd et al.

*Primary Examiner* — John Follansbee
*Assistant Examiner* — Alan S Chou
(74) *Attorney, Agent, or Firm* — Yee & Associates, P.C.; Justin M. Dillon

(57) ABSTRACT

A mechanism for offloading the management of receive queues in a split (e.g. split socket, split iSCSI, split DAFS) stack environment, including efficient queue flow control and TCP/IP retransmission support. An Upper Layer Protocol (ULP) creates receive work queues and completion queues that are utilized by an Internet Protocol Suite Offload Engine (IPSOE) and the ULP to transfer information and carry out send operations. As consumers initiate receive operations, receive work queue entries (RWQEs) are created by the ULP and written to the receive work queue (RWQ). The ISPOE is notified of a new entry to the RWQ and it subsequently reads this entry that contains pointers to the data that is to be received. After the data is received, the IPSOE creates a completion queue entry (CQE) that is written into the completion queue (CQ). After the CQE is written, the ULP subsequently processes the entry and removes it from the CQE, freeing up a space in both the RWQ and CQ. The number of entries available in the RWQ are monitored by the ULP so that it does not overwrite any valid entries. Likewise, the IPSOE monitors the number of entries available in the CQ, so as not overwrite the CQ.

15 Claims, 34 Drawing Sheets

U.S. PATENT DOCUMENTS

| | | |
|---|---|---|
| 2003/0200284 A1 | 10/2003 | Philbrick et al. |
| 2004/0042464 A1 | 3/2004 | Elzur et al. |
| 2004/0042483 A1 | 3/2004 | Elzur et al. |
| 2004/0049600 A1 | 3/2004 | Boyd et al. |
| 2004/0049601 A1 | 3/2004 | Boyd et al. |
| 2004/0049603 A1 | 3/2004 | Boyd et al. |
| 2004/0062245 A1 | 4/2004 | Sharp et al. |
| 2004/0093411 A1 | 5/2004 | Elzur et al. |
| 2004/0133713 A1 | 7/2004 | Elzur |
| 2007/0253430 A1 * | 11/2007 | Minami et al. ........... 370/395.52 |

* cited by examiner

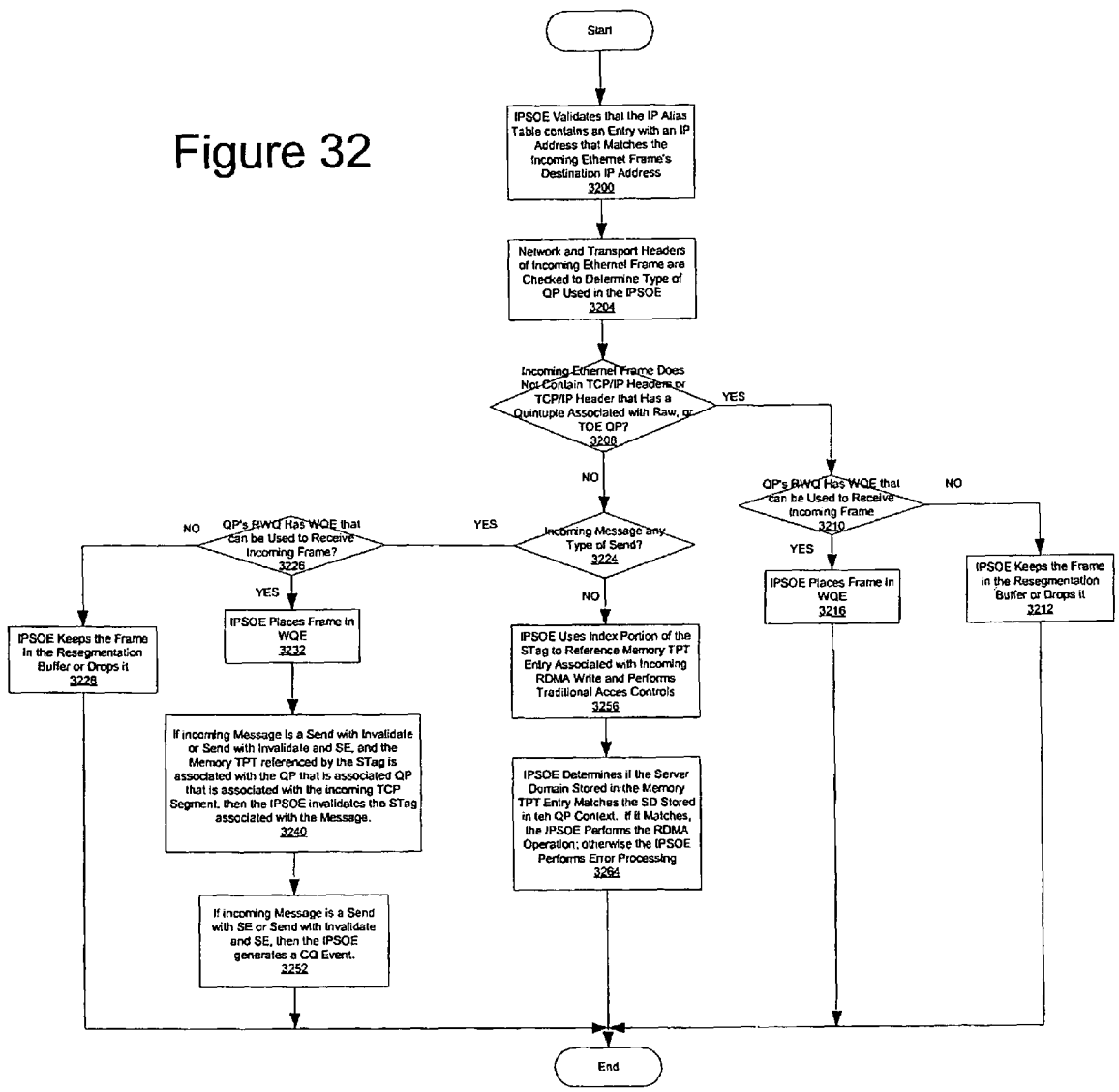

RECEIVE QUEUE DEVICE WITH EFFICIENT QUEUE FLOW CONTROL, SEGMENT PLACEMENT AND VIRTUALIZATION MECHANISMS

RELATED APPLICATION

This application is a divisional of application Ser. No. 10/235,672 filed Sep. 5 2002, now abandoned, which is herein incorporated by reference.

This application is related to commonly assigned and co-pending U.S. patent application Ser. No. 10/235,689 entitled "SPLIT SOCKET SEND QUEUE APPARATUS AND METHOD WITH EFFICIENT QUEUE FLOW CONTROL, RETRANSMISSION AND SACK SUPPORT MECHANISMS", filed on Sep. 5, 2002, U.S. patent application Ser. No. 10/235,679 entitled "MEMORY MANAGEMENT OFFLOAD FOR RDMA ENABLED NETWORK ADAPTERS", filed on Sep. 5, 2002, U.S. patent application Ser. No. 10/235,686 entitled "iSCSI DRIVER TO ADAPTER INTERFACE PROTOCOL", filed on Sep. 5, 2002, and co-pending and commonly assigned U.S. patent application Ser. No. 10/132,461 entitled "LOGICAL PARTITION HOSTED VIRUTAL INPUT/OUTPUT USING SHARED TRANSLATION CONTROL ENTRIES", all of which are hereby incorporated by reference.

BACKGROUND OF THE INVENTION

1. Technical Field

The present invention relates generally to communication protocols between a host computer and an input/output (I/O) device. More specifically, the present invention provides a hardware implementation for offloading management of a receive queue. In particular, the present invention provides a mechanism by which work requests are turned into work queue entries (WQEs) and are passed from Upper Layer Protocol (e.g. sockets) software to an Internet Protocol (IP) Suite Offload Engine (IPSOE). The present invention also provides a mechanism by which completed WQEs are passed back to the Upper Layer Protocol (ULP) software. The present invention also provides a mechanism for supporting Selective Acknowledgements. Finally, the present invention provides a mechanism by which an IPSOE can be shared between virtual hosts of a single physical host.

2. Description of Related Art

In an Internet Protocol (IP) Network, the software provides a message passing mechanism that can be used to communicate with input/output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through upper level protocols, such as Sockets, iSCSI, and Direct Access File System (DAFS).

Unfortunately, the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol 4, No. 6, pp. 817-828, December 1996; and D. D. Clark, V. Jacobson, J. Romkey, H. Salwen, "An analysis of TCP processing overhead", IEEE Communications Magazine, volume: 27, Issue: 6, Jun. 1989, pp 23-29). In the future the network stack will continue to consume excessive resources for several reasons, including: increased use of networking by applications; use of network security protocols; and the underlying fabric bandwidths are increasing at a higher rate than microprocessor and memory bandwidths. To address this problem, the industry is offloading the network stack processing to an IP Suite Offload Engine (IPSOE).

There are two offload approaches being taken in the industry. The first approach uses the existing TCP/IP network stack, without adding any additional protocols. This approach can offload TCP/IP to hardware, but unfortunately does not remove the need for receive side copies. As noted in the papers above, copies are one of the largest contributors to central processing unit (CPU) and memory bandwidth utilization. To remove the need for copies, the industry is pursuing the second approach that consists of adding Framing, Direct Data Placement (DDP), and Remote Direct Memory Access (RDMA) over the TCP and SCTP protocols. The IP Suite Offload Engine (IPSOE) required to support these two approaches is similar, the key difference being that in the second approach the hardware must support the additional protocols.

The IPSOE provides a message passing mechanism that can be used by sockets, Internet Small Computer System Interface (iSCSI), Direct Access File Systems (DAFS), and other Upper Layer Protocols (ULPs) to communicate between nodes. Processes executing on host computers, or devices, access the IP network by posting send/receive messages to send/receive work queues on an IPSOE. These processes also are referred to as "consumers".

The send/receive work queues (WQ) are assigned to a consumer as a queue pair (QP). The messages can be sent over three different transport types: traditional TCP, RDMA TCP, UDP, or SCTP. Consumers retrieve the results of these messages from a completion queue (CQ) through IPSOE send and receive work completion (WC) queues. The source IPSOE takes care of segmenting outbound messages and sending them to the destination. The destination IPSOE takes care of reassembling inbound messages and placing the inbound messages in the memory space designated by the destination's consumer. These consumers use IPSOE verbs to access the functions supported by the IPSOE. The software that interprets verbs and directly accesses the IPSOE is known as the IPSO interface (IPSOI).

Today the host CPU performs most IP suite processing. IP Suite Offload Engines offer a higher performance interface for communicating to other general purpose computers and I/O devices. Data sends or receives through the IPSOE require that the CPU either copy data from one memory location to another or register the memory so that the IPSOE can directly access the memory region. Each of these options requires significant CPU resources with the memory registration option being preferred for large memory transfers, however, as network speeds increase the amount of CPU resources required will increase. A simple mechanism is needed to implement Receive Queue in the IPSOE and perform RDMA, DDP, framing, and TCP/IP processing in the IPSOE. The mechanism needs to maintain all RDMA, DDP, framing, TCP, IP, and Ethernet state in the IPSOE. It must also provide the necessary protection to support out of user space Receive Queue operations. The present invention also provides a mechanism for supporting Selective Acknowledgements. Finally, the present invention provides a mechanism by which an IPSOE can be shared between virtual hosts of a single physical host.

SUMMARY OF THE INVENTION

The present invention provides a method, computer program product, and distributed data processing system for management of a receive queue in a split (e.g. split socket, split iSCSI, split DAFS) stack in order to reduce the processing overhead in host processors. Specifically, the present invention is directed to a mechanism for turning work requests into work queue entries and inserting these work queue entries into the receive queue. This invention also provides a mechanism by which work queue entries are transmitted from Upper Layer Protocol (e.g. socket) software to the Internet Protocol Suite Offload Engine (IPSOE) and are processed by the IPSOE. The present invention also provides a mechanism by which the IPSOE converts completed work queue elements into work completion entries and passes these work completion entries back to the software. The present invention also provides a mechanism for supporting Selective Acknowledgements. Finally, the present invention provides a mechanism by which an IPSOE can be shared between virtual hosts of a single physical host.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 32 is a flowchart outlining the IPSOE Incoming Ethernet Frame Processing mechanism in accordance with the present invention.

DETAILED DESCRIPTION OF THE PREFERRED EMBODIMENT

The present invention provides a distributed computing system having endnodes, switches, routers, and links interconnecting these components. The endnodes can be Internet Protocol Suite Offload Engines or traditional host software based Internet protocol suites. Each endnode uses send and receive queue pairs to transmit and receive messages. The endnodes segment the message into frames and transmit the frames over the links. The switches and routers interconnect the endnodes and route the frames to the appropriate endnode. The endnodes reassemble the frames into a message at the destination.

Figure 1:
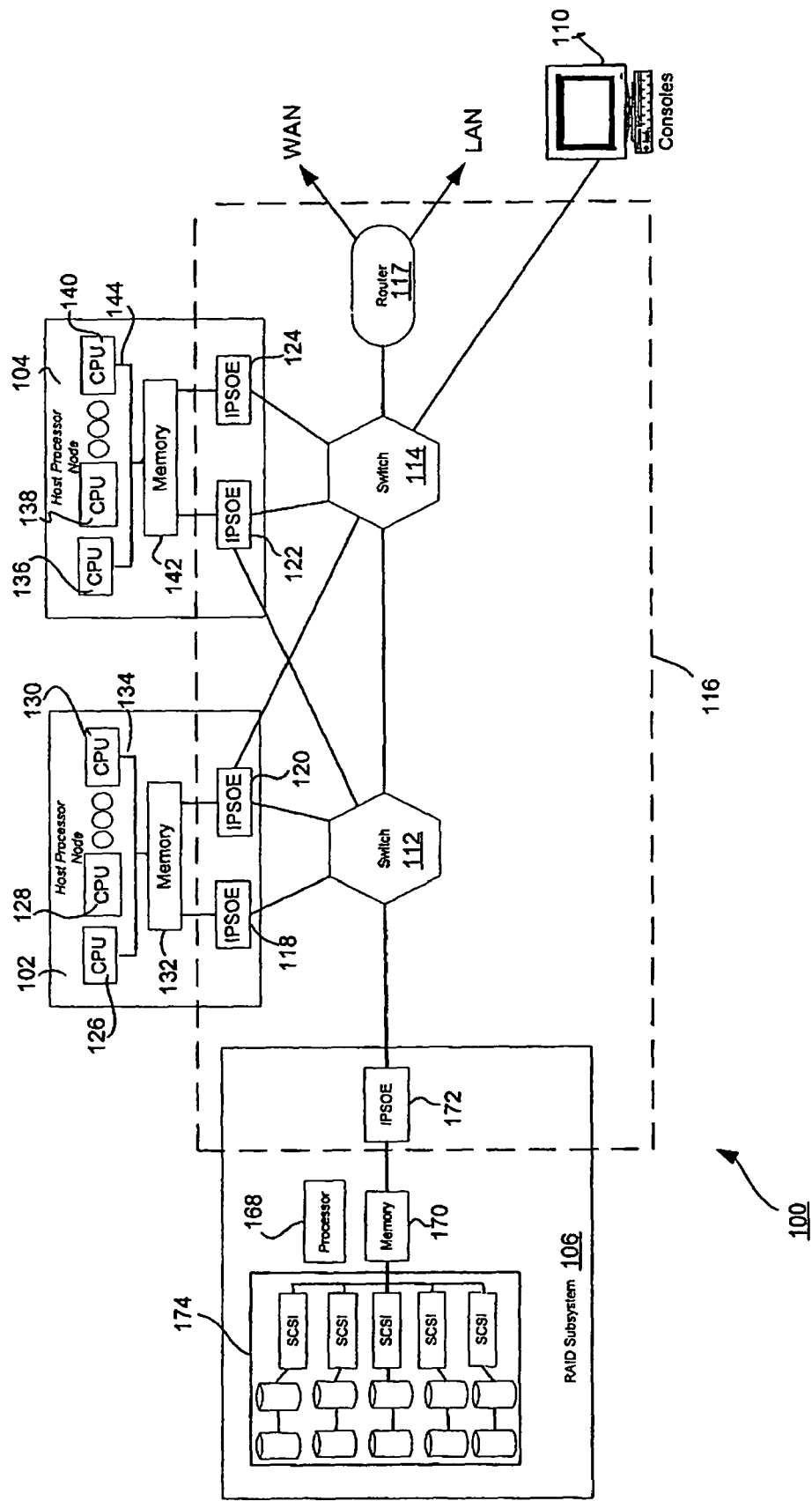
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of an Internet protocol network (IP net), such as IP net 100 and is provided merely for illustrative purposes and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

IP net 100 is a high-bandwidth, low-latency network interconnecting nodes within the distributed computer system. A node is any component attached to one or more links of a network and forming the origin and/or destination of messages within the network. In the depicted example, IP net 100 includes nodes in the form of host processor node 102, host processor node 104, and redundant array independent disk (RAID) subsystem node 106. The nodes illustrated in FIG. 1 are for illustrative purposes only, as IP net 100 can connect any number and any type of independent processor nodes, storage nodes, and special purpose processing nodes. Any one of the nodes can function as an endnode, which is herein defined to be a device that originates or finally consumes messages or frames in IP net 100.

In one embodiment of the present invention, an error handling mechanism in distributed computer systems is present in which the error handling mechanism allows for TCP or SCTP communication between endnodes in a distributed computing system, such as IP net 100.

A message, as used herein, is an application-defined unit of data exchange, which is a primitive unit of communication between cooperating processes. A frame is one unit of data encapsulated by Internet Protocol Suite headers and/or trailers. The headers generally provide control and routing information for directing the frame through IP net 100. The trailer generally contains control and cyclic redundancy check (CRC) data for ensuring frames are not delivered with corrupted contents.

Within a distributed computer system, IP net 100 contains the communications and management infrastructure supporting various forms of traffic, such as storage, interprocess communications (IPC), file access, and sockets. IP net 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the IP net fabric. The multiple ports and paths through the IP net shown in FIG. 1 can be employed for fault tolerance and increased bandwidth data transfers.

The IP net 100 in FIG. 1 includes switch 112, switch 114, and router 117. A switch is a device that connects multiple links together and allows routing of frames from one link to another link using the layer 2 destination address field. When the Ethernet is used as the link, the destination field is known as the media access control (MAC) address. A router is a device that routes frames based on the layer 3 destination address field. When Internet Protocol (IP) is used as the layer 3 protocol, the destination address field is an IP address.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types (TCP and SCTP), endnodes, such as host processor endnodes and I/O adapter endnodes, generate request frames and return acknowledgment frames. Switches and routers pass frames along, from the source to the destination.

In IP net 100 as illustrated in FIG. 1, host processor node 102, host processor node 104, and RAID subsystem node 106 include at least one IPSOE to interface to IP net 100. In one embodiment, each IPSOE is an endpoint that implements the IPSOI in sufficient detail to source or sink frames transmitted on IP net 100. Host processor node 102 contains IPSOEs in the form of host IPSOE 118 and IPSOE 120. Host processor node 104 contains IPSOE 122 and IPSOE 124. Host processor node 102 also includes central processing units 126-130 and a memory 132 interconnected by bus system 134. Host processor node 104 similarly includes central processing units 136-140 and a memory 142 interconnected by a bus system 144.

IPSOE 118 provides a connection to switch 112, while IPSOE 124 provides a connection to switch 114, and IP Suite Offload Engines 120 and 122 provide a connection to switches 112 and 114.

In one embodiment, an IP Suite Offload Engine is implemented in hardware or a combination of hardware and offload microprocessor(s). In this implementation, IP suite processing is offloaded to the IPSOE. This implementation also permits multiple concurrent communications over a switched network without the traditional overhead associated with communicating protocols. In one embodiment, the IPSOEs and IP net 100 in FIG. 1 provide the consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. In this example, RAID subsystem node 106 in FIG. 1 includes processor 168, memory 170, IP Suite Offload Engine (IPSOE) 172, and multiple redundant and/or striped storage disk unit 174.

IP net 100 handles data communications for storage, interprocessor communications, file accesses, and sockets. IP net 100 supports high-bandwidth, scalable, and extremely low latency communications. User clients can bypass the operating system kernel process and directly access network communication components, such as IPSOEs, which enable efficient message passing protocols. IP net 100 is suited to current computing models and is a building block for new forms of storage, cluster, and general networking communication. Further, IP net 100 in FIG. 1 allows storage nodes to communicate among themselves or communicate with any or all of the processor nodes in a distributed computer system. With storage attached to IP net 100, the storage node has substantially the same communication capability as any host processor node in IP net 100.

In one embodiment, the IP net 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for storage, cluster, and general networking communications. A typical storage operation employs a combination of channel and memory semantics. In an illustrative example storage operation of the distributed computer system shown in FIG. 1, a host processor node, such as host processor node 102, initiates a storage operation by using channel semantics to send a disk write command to the RAID subsystem IPSOE 172. The RAID subsystem examines the command and uses memory semantics to read the data buffer directly from the memory space of the host processor node. After the data buffer is read, the RAID subsystem employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
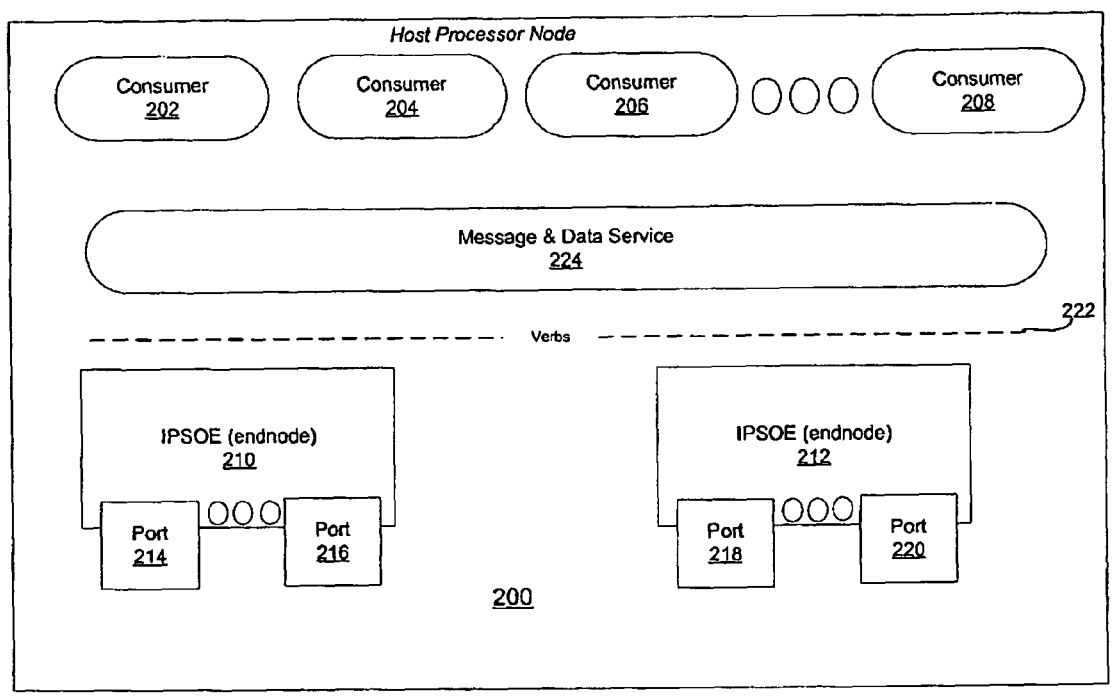
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202-208, which are processes executing on host processor node 200. Host processor node 200 also includes IP Suite Offload Engine (IPSOE) 210 and IPSOE 212. IPSOE 210 contains ports 214 and 216 while IPSOE 212 contains ports 218 and 220. Each port connects to a link. The ports can connect to one IP net subnet or multiple IP net subnets, such as IP net 100 in FIG. 1.

Consumers 202-208 transfer messages to the IP net via the verbs interface 222 and message and data service 224. A verbs interface is essentially an abstract description of the functionality of an IP Suite Offload Engine. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through IPSOE 210 and IPSOE 212. Message and data service 224 provides an interface to consumers 202-208 to process messages and other data.

Figure 3A:
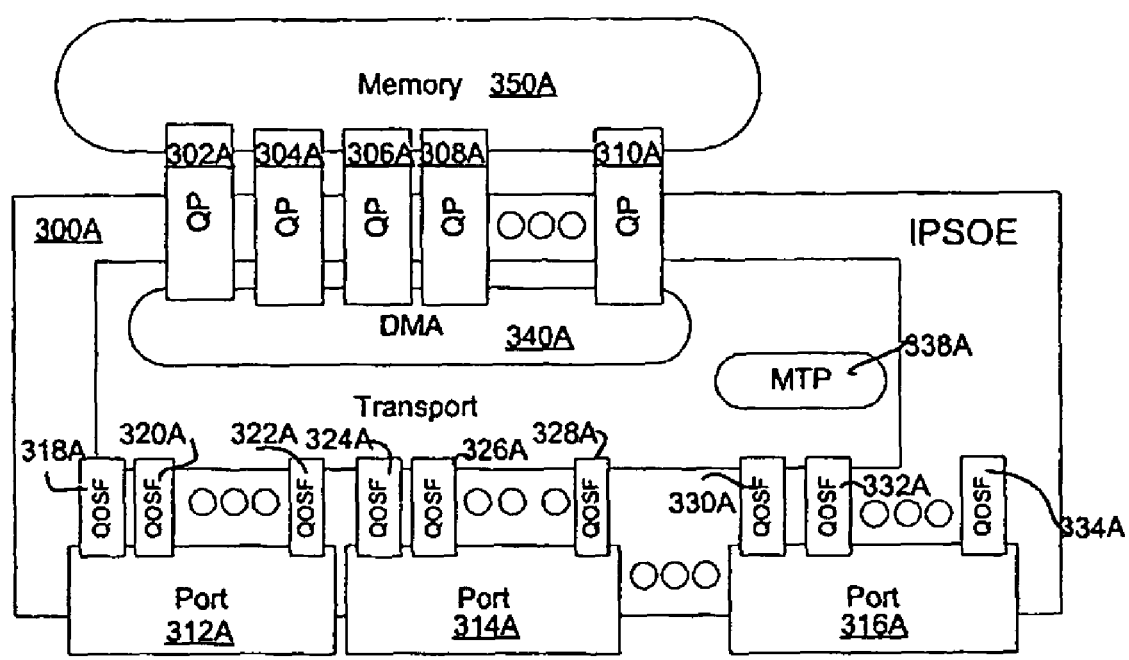
FIG. 3A is a diagram of an IP Suite Offload Engine in accordance with a preferred embodiment of the present invention.

With reference now to FIG. 3A, a diagram of an IP Suite Offload Engine is depicted in accordance with a preferred embodiment of the present invention. IP Suite Offload Engine 300A shown in FIG. 3A includes a set of queue pairs (QPs) 302A-310A, which are used to transfer messages to the IPSOE ports 312A-316A. Buffering of data to IPSOE ports 312A-316A is channeled using the network layer's quality of service field (QOSF), for example, the Traffic Class field in the IP Version 6 specification, 318A-334A. Each network layer quality of service field has its own flow control. Internet Engineering Task Force (IETF) standard network protocols are used to configure the link and network addresses of all IP Suite Offload Engine ports connected to the network. Two such protocols are Address Resolution Protocol (ARP) and Dynamic Host Configuration Protocol. Memory translation and protection (MTP) 338A is a mechanism that translates virtual addresses to physical addresses and validates access rights. Direct memory access (DMA) 340A provides for direct memory access operations using memory 350A with respect to queue pairs 302A-310A.

A single IP Suite Offload Engine, such as the IPSOE 300A shown in FIG. 3A, can support thousands of queue pairs. Each queue pair consists of a send work queue (SWQ) and a receive work queue (RWQ). The send work queue is used to send channel and memory semantic messages. The receive work queue receives channel semantic messages. A consumer calls an operating system specific programming interface, which is herein referred to as "verbs", to place work requests (WRs) onto a work queue.

Figure 3B:
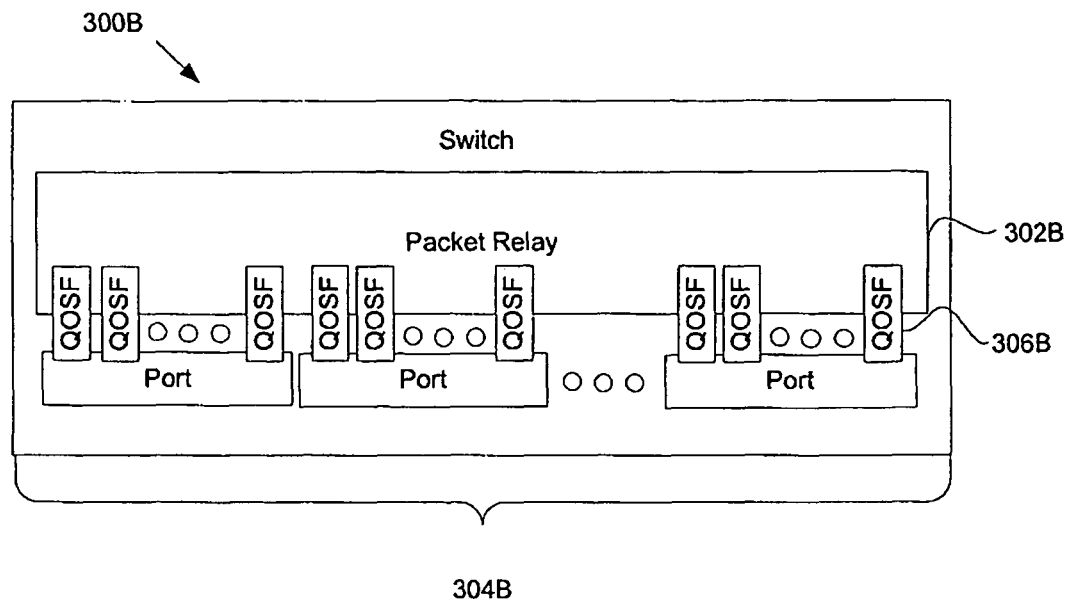
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through link or network layer quality of service fields such as IP version 4's Type of Service field 306B. Generally, a switch such as switch 300B can route frames from one port to any other port on the same switch.

Figure 3C:
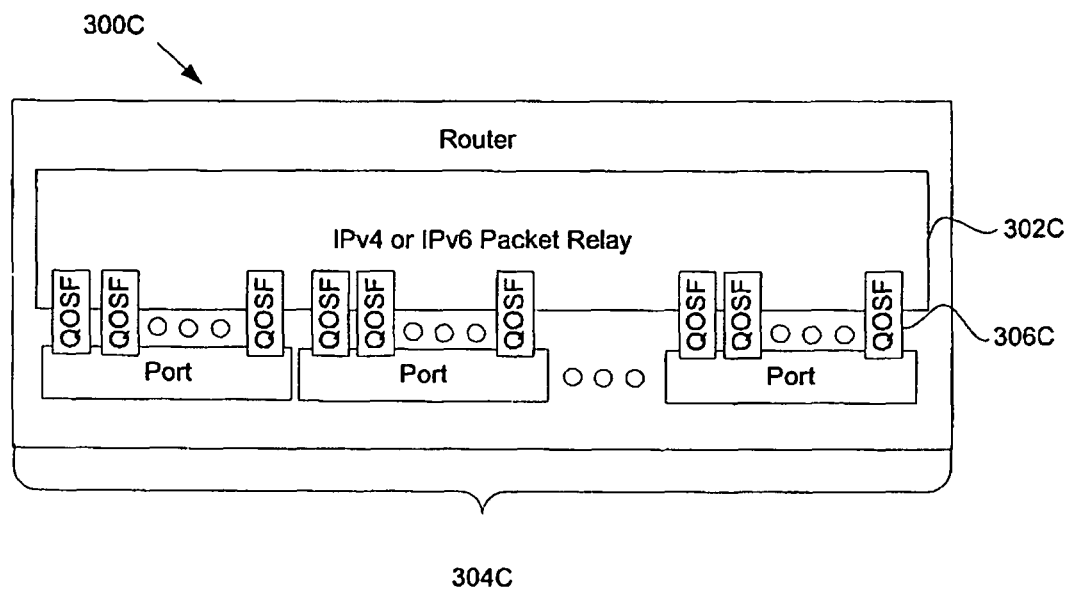
FIG. 3C is a diagram of a router in accordance with a preferred embodiment of the present invention.

Similarly, FIG. 3C depicts a router 300C according to a preferred embodiment of the present invention. Router 300C includes a frame relay 302C in communication with a number of ports 304C through network layer quality of service fields such as IP version 4's Type of Service field 306C. Like switch 300B, router 300C will generally be able to route frames from one port to any other port on the same router.

Figure 4:
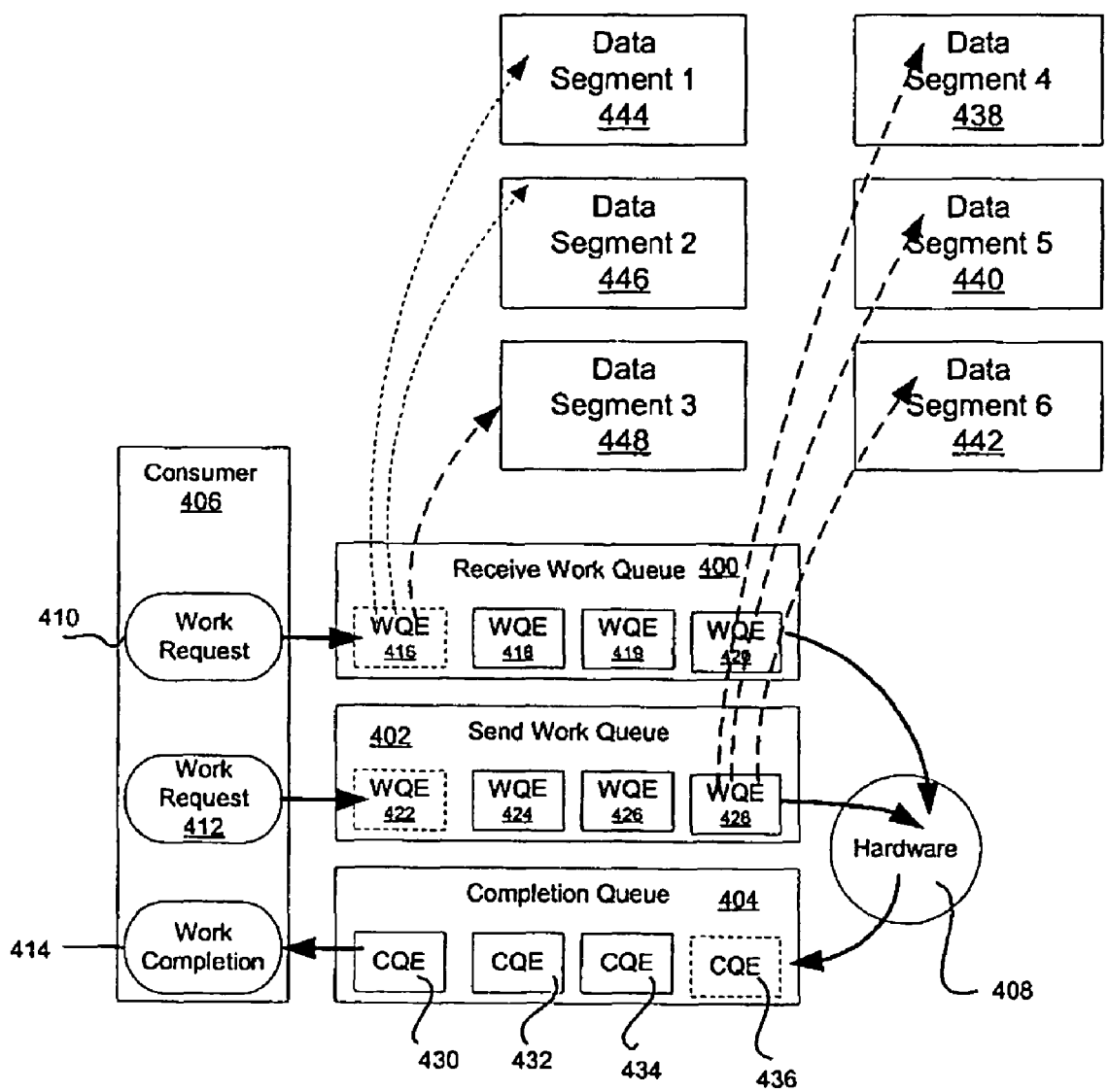
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the IP net fabric. Receive work queue 400 contains work queue elements (WQEs) 416-420, describing where to place incoming channel semantic data from the IP net fabric. A work queue element is processed by hardware 408 in the IPSOE.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. The remote virtual addresses are in the address context of the process owning the remote queue pair targeted by the RDMA read work queue element.

A RDMA write work queue element provides a memory semantic operation to write a virtually contiguous memory space on a remote node. For example, work queue element 416 in receive work queue 400 references data segment 1 444, data segment 2 446, and data segment 448. The RDMA write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. The RDMA FetchOp is not included in current RDMA over IP standardization efforts, but is described here, because it may be used as a value-added feature in some implementations.

A bind (unbind) remote access key (R_Key) work queue element provides a command to the IP Suite Offload Engine hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports three types of transport services: TCP, SCTP, and UDP.

TCP and SCTP associate a local queue pair with one and only one remote queue pair. TCP and SCTP require a process to create a queue pair for each process that TCP and SCTP are to communicate with over the IP net fabric. Thus, if each of N host processor nodes contains P processes, and all P processes on each node wish to communicate with all the processes on all the other nodes, each host processor node requires $P^2 \times (N-1)$ queue pairs. Moreover, a process can associate a queue pair to another queue pair on the same IPSOE.

Figure 5:
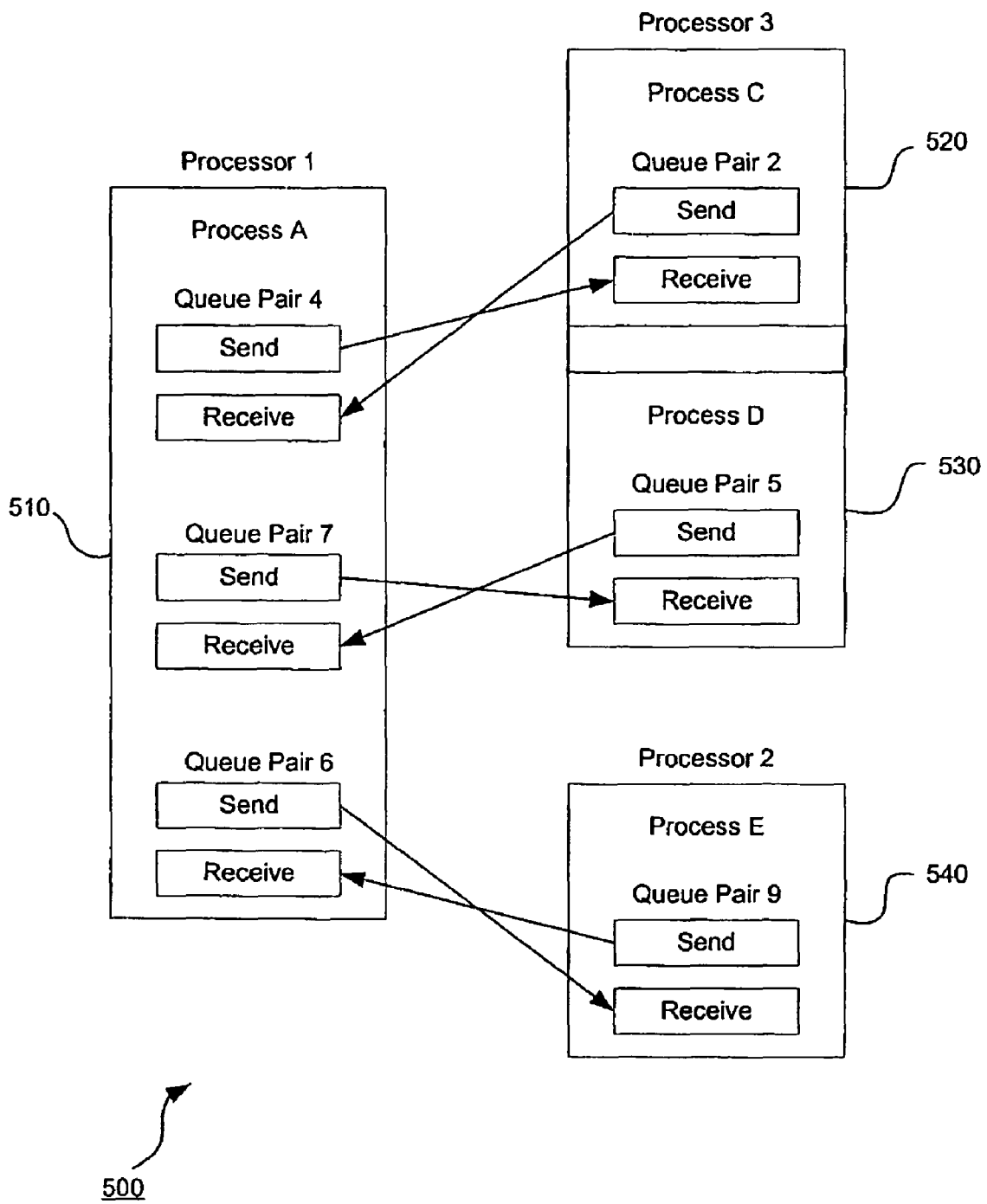
FIG. 5 is a diagram illustrating a portion of a distributed computer system in accordance with a preferred embodiment of the present invention in which a TCP or SCTP transport is used.

A portion of a distributed computer system employing TCP or SCTP to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The TCP or SCTP of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a TCP or SCTP causes data to be written into the receive memory space referenced by a receive WQE of the associated queue pair. RDMA operations operate on the address space of the associated queue pair.

In one embodiment of the present invention, the TCP or SCTP is made reliable because hardware maintains sequence numbers and acknowledges all frame transfers. A combination of hardware and IP net driver software retries any failed communications. The process client of the queue pair obtains reliable communications even in the presence of bit errors, receive underruns, and network congestion. If alternative paths exist in the IP net fabric, reliable communications can be maintained even in the presence of failures of fabric switches, links, or IP Suite Offload Engine ports.

In addition, acknowledgements may be employed to deliver data reliably across the IP net fabric. The acknowledgement may, or may not, be a process level acknowledgement, i.e. an acknowledgement that validates that a receiving process has consumed the data. Alternatively, the acknowledgement may be one that only indicates that the data has reached its destination.

The User Datagram Protocol is connectionless. The UDP is employed by management applications to discover and integrate new switches, routers, and endnodes into a given distributed computer system. The UDP does not provide the reliability guarantees of the TCP or SCTP. The UDP accordingly operates with less state information maintained at each endnode.

Figure 6:
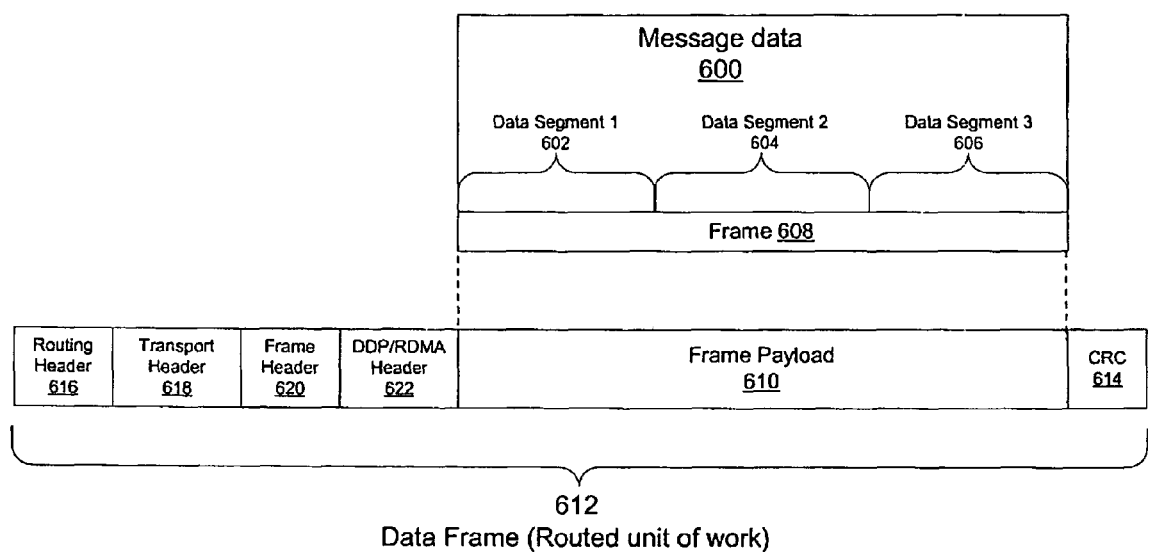
FIG. 6 is an illustration of a data frame in accordance with a preferred embodiment of the present invention.

Turning next to FIG. 6, an illustration of a data frame is depicted in accordance with a preferred embodiment of the present invention. A data frame is a unit of information that is routed through the IP net fabric. The data frame is an endnode-to-endnode construct, and is thus created and consumed by endnodes. For frames destined to an IPSOE, the data frames are neither generated nor consumed by the switches and routers in the IP net fabric. Instead for data frames that are destined to an IPSOE, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 600 contains data segment 1 602, data segment 2 604, and data segment 3 606, which are similar to the data segments illustrated in FIG. 4. In this example, these data segments form a frame 608, which is placed into frame payload 610 within data frame 612. Additionally, data frame 612 contains cyclic redundancy check (CRC) 614, which is used for error checking. Additionally, routing header 616 and transport header 618 are present in data frame 612. Routing header 616 is used to identify source and destination ports for data frame 612. Transport header 618 in this example specifies the sequence number and the source and destination port number for data frame 612. The sequence number is initialized when communication is established and increments by 1 for each byte of frame header, DDP/RDMA header, data payload, and CRC. Frame header 620 in this example specifies the destination queue pair number associated with the frame and the length of the Direct Data Placement and/or Remote Direct Memory Access (DDP/RDMA) header plus data payload plus CRC. DDP/RDMA header 622 specifies the message identifier and the placement information for the data payload. The message identifier is constant for all frames that are part of a message. Example message identifiers include, for example, send, write RDMA, and read RDMA.

Figure 7:
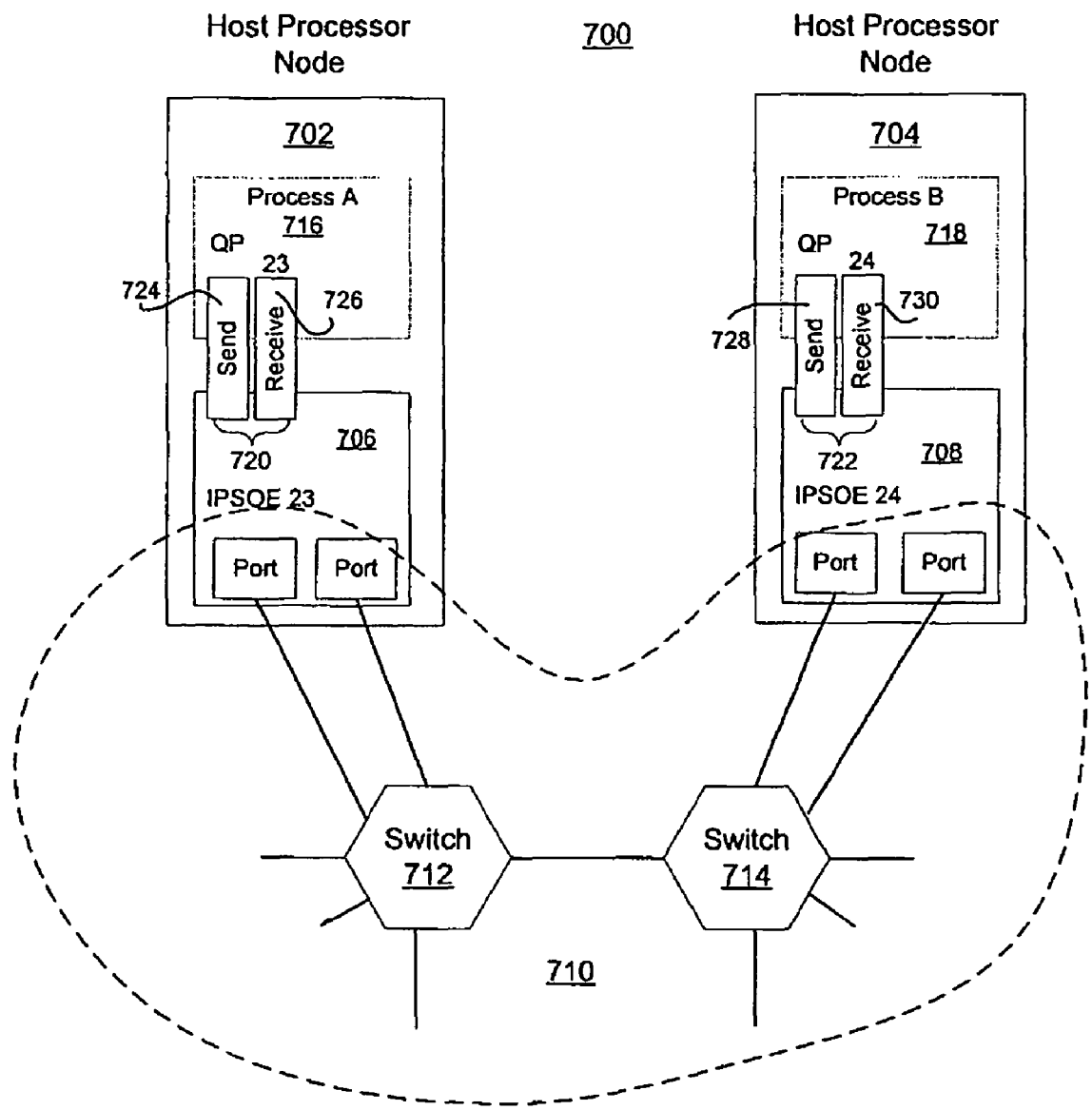
FIG. 7 is a diagram illustrating a portion of a distributed computer system in accordance with a preferred embodiment of the present invention.

In FIG. 7, a portion of a distributed computer system 700 is depicted to illustrate an example request and acknowledgment transaction. Distributed computer system 700 in FIG. 7 includes a host processor node 702 running process A 716 and a host processor node 704 running process B 718. Host processor node 702 includes an IPSOE 706. Host processor node 704 includes an IPSOE 708. The distributed computer system in FIG. 7 includes IP net fabric 710, which includes switch 712 and switch 714. The IP net fabric includes a link coupling IPSOE 706 to switch 712; a link coupling switch 712 to switch 714; and a link coupling IPSOE 708 to switch 714.

In the example transactions, host processor node 702 includes a client process A. Host processor node 704 includes a client process B. Client process A interacts with host IPSOE 706 through queue pair 23 720 comprising send queue 724 and receive queue 726. Client process B interacts with host IPSOE 708 through queue pair 24 722 comprising send queue 728 and receive queue 730. Queue pairs 23 and 24 are data structures that include a send work queue and a receive work queue.

Process A initiates a message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a part of the message, such as indicated by data segments 1, 2, and 3, which respectively hold message parts 1, 2, and 3, in FIG. 4.

Hardware in host IPSOE 706 reads the work queue element and segments the message stored in virtual contiguous buffers into data frames, such as the data frame illustrated in FIG. 6. Data frames are routed through the IP net fabric, and for reliable transfer services, are acknowledged by the final destination endnode. If not successfully acknowledged, the data frame is retransmitted by the source endnode. Data frames are generated by source endnodes and consumed by destination endnodes.

Figure 8:
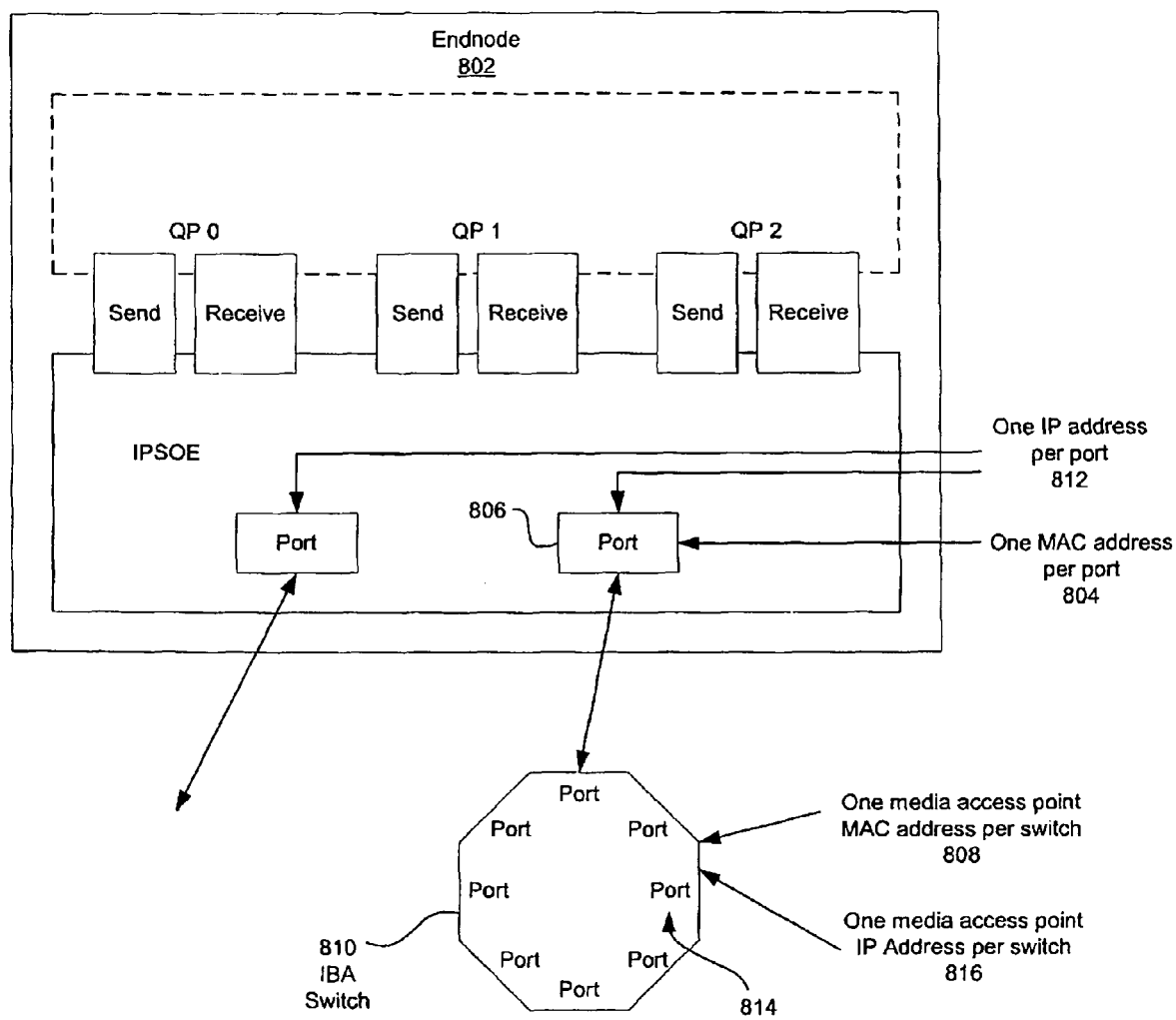
FIG. 8 is a diagram illustrating the network addressing used in a distributed networking system in accordance with the present invention.

With reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an endnode specified by the host name. Thus, there is one host name per node, but a node can have multiple IPSOEs.

A single link layer address (e.g. Ethernet Media Access Layer Address) 804 is assigned to each port 806 of an endnode component 802. A component can be an IPSOE, switch, or router. All IPSOE and router components must have a MAC address. A media access point on a switch is also assigned a MAC address.

One network address (e.g. IP Address) 812 is assigned to each port 806 of an endnode component 902. A component can be an IPSOE, switch, or router. All IPSOE and router components must have a network address. A media access point on a switch is also assigned a MAC address.

Each port of switch 810 does not have a link layer address associated with it. However, switch 810 can have a media access port 814 that has a link layer address 816 and a network layer address 808 associated with it.

Figure 9:
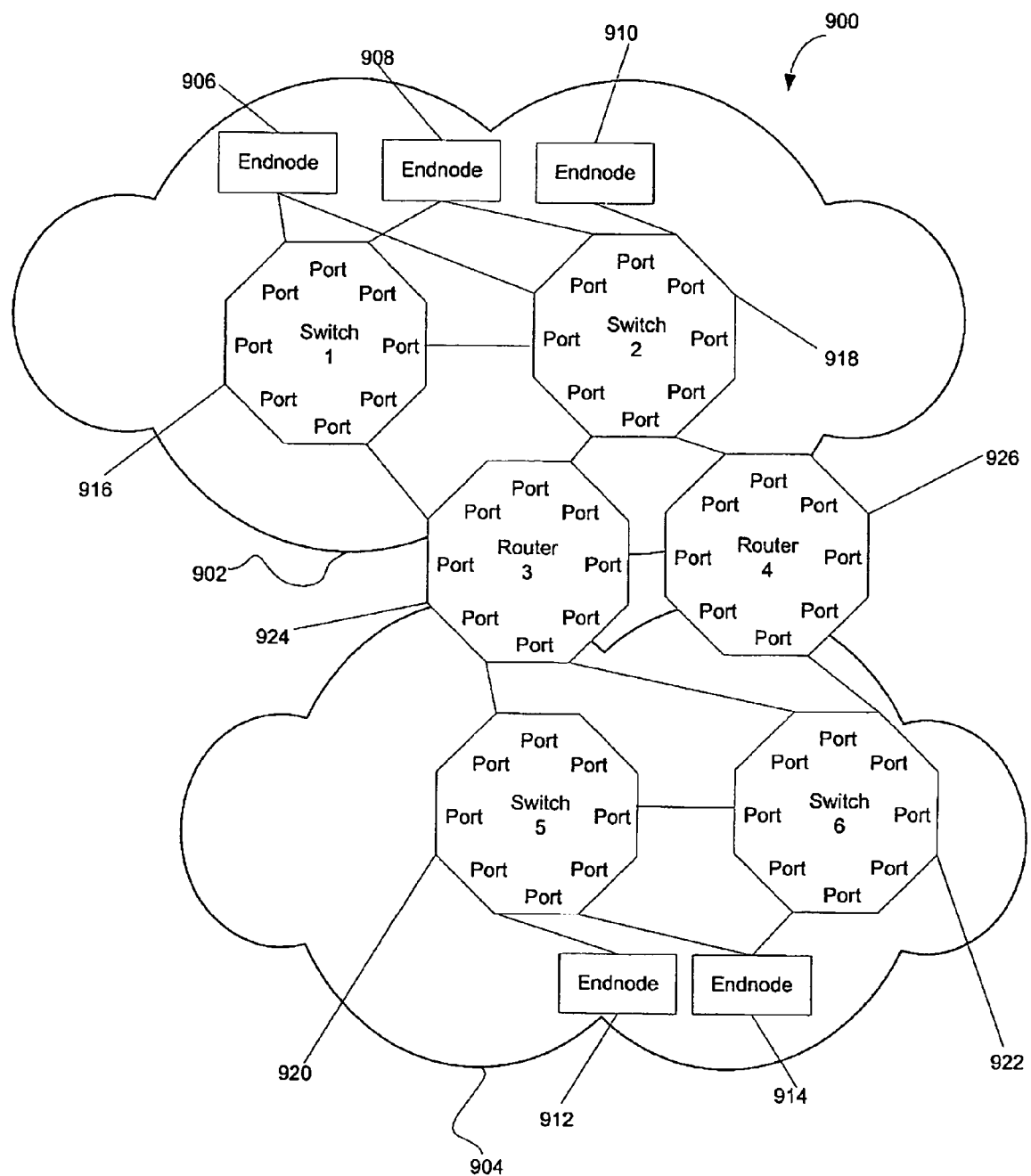
FIG. 9 is a diagram of a portion of a distributed computer system containing subnets in a preferred embodiment of the present invention.

A portion of a distributed computer system in accordance with a preferred embodiment of the present invention is illustrated in FIG. 9. Distributed computer system 900 includes a subnet 902 and a subnet 904. Subnet 902 includes host processor nodes 906, 908, and 910. Subnet 904 includes host processor nodes 912 and 914. Subnet 902 includes switches 916 and 918. Subnet 904 includes switches 920 and 922.

Routers create and connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the destination link layer address (e.g. MAC address) that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 9, for expansion too much larger systems, subnets are connected with routers, such as routers 924 and 926. The router interprets the destination network layer address (e.g. IP address) and routes the frame.

An example embodiment of a switch is illustrated generally in FIG. 3B. Each I/O path on a switch or router has a port. Generally, a switch can route frames from one port to any other port on the same switch.

Within a subnet, such as subnet 902 or subnet 904, a path from a source port to a destination port is determined by the link layer address (e.g. MAC address) of the destination host IPSOE port. Between subnets, a path is determined by the network layer address (IP address) of the destination IPSOE port and by the link layer address (e.g. MAC address) of the router port, which will be used to reach the destination's subnet.

In one embodiment, the paths used by the request frame and the request frame's corresponding positive acknowledgment (ACK) frame is not required to be symmetric. In one embodiment employing oblivious routing, switches select an output port based on the link layer address (e.g. MAC address). In one embodiment, a switch uses one set of routing decision criteria for all its input ports in the switch. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses IP Suite Offload Engine hardware through one or more queue pairs, such as the queue pairs illustrated in FIGS. 3A, 5, and 8. The client process calls an operating system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the IP net fabric must be sufficiently specified to allow devices to interoperate in a heterogeneous vendor environment.

In one embodiment, IPSOE hardware detects work queue element postings and accesses the work queue element. In this embodiment, the IPSOE hardware translates and validates the work queue element's virtual addresses and accesses the data.

An outgoing message is split into one or more data frames. In one embodiment, the IPSOE hardware adds a DDP/RDMA header, frame header and CRC, transport header and a network header to each frame. The transport header includes sequence numbers and other transport information. The network header includes routing information, such as the destination IP address and other network routing information. The link header contains the destination link layer address (e.g. MAC address) or other local routing information.

If a TCP or SCTP is employed, when a request data frame reaches its destination endnode, acknowledgment data frames are used by the destination endnode to let the request data frame sender know the request data frame was validated and accepted at the destination. Acknowledgement data frames acknowledge one or more valid and accepted request data frames. The requestor can have multiple outstanding request data frames before it receives any acknowledgments. In one embodiment, the number of multiple outstanding messages, i.e. request data frames, is determined when a queue pair is created.

Figure 10:
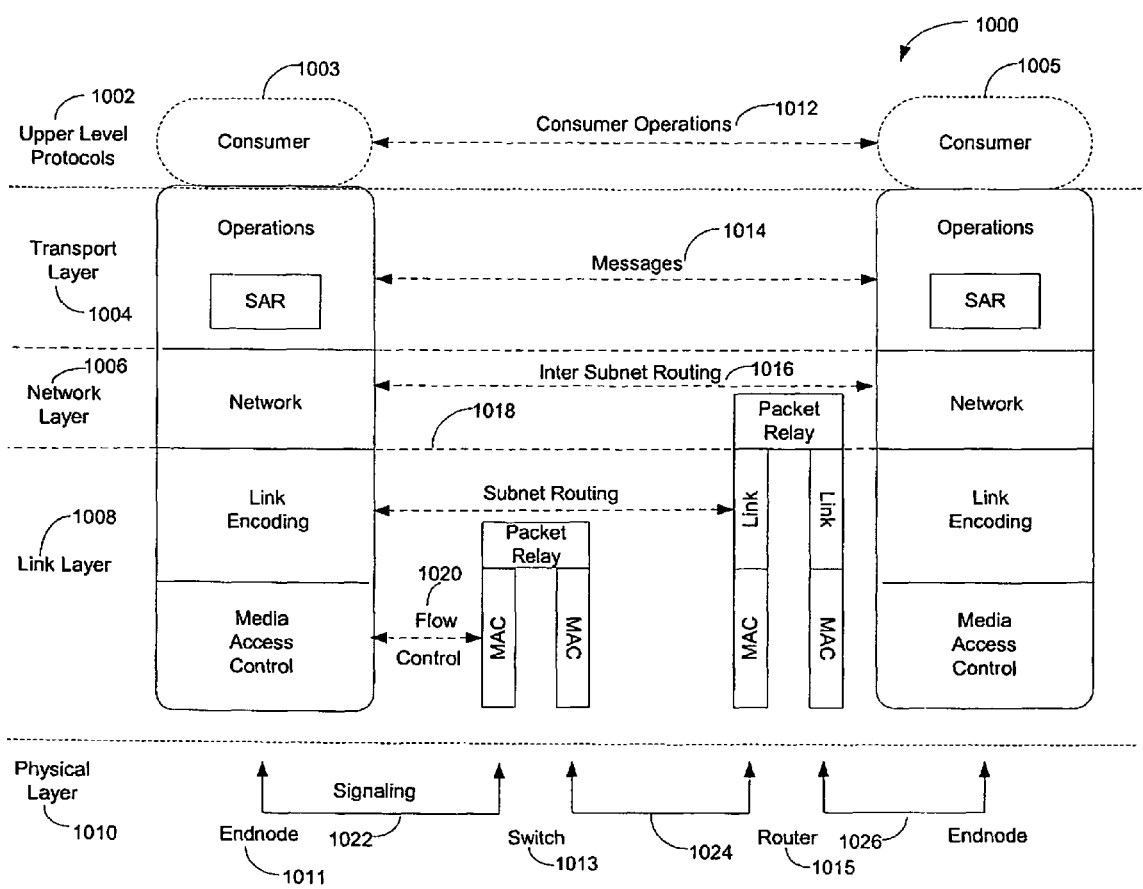
FIG. 10 is a diagram of a layered communication architecture used in a preferred embodiment of the present invention.

One embodiment of a layered architecture 1000 for implementing the present invention is generally illustrated in diagram form in FIG. 10. The layered architecture diagram of FIG. 10 shows the various layers of data communication paths, and organization of data and control information passed between layers.

IPSOE endnode protocol layers (employed by endnode 1011, for instance) include upper level protocols 1002 defined by consumer 1003, transport layer 1004; network layer 1006, link layer 1008, and physical layer 1010. Switch layers (employed by switch 1013, for instance) include link layer 1008 and physical layer 1010. Router layers (employed by router 1015, for instance) include network layer 1006, link layer 1008, and physical layer 1010.

Layered architecture 1000 generally follows an outline of a classical communication stack in order to complete consumer operations 1012 of transferring data between consumers 1003 and 1005. With respect to the protocol layers of endnode 1011, for example, upper layer protocols 1002 employs verbs to create messages at transport layer 1004. Transport layer 1004 passes messages 1014 to network layer 1006. Network layer 1006 routes frames between network subnets 1016. Link layer 1008 routes frames within a network subnet 1018. Physical layer 1010 sends bits or groups of bits to the physical layers of other devices. Each of the layers is unaware of how the upper or lower layers perform their functionality.

Consumers 1003 and 1005 represent applications or processes that employ the other layers for communicating between endnodes. Transport layer 1004 provides end-to-end message movement. In one embodiment, the transport layer provides four types of transport services as described above which are traditional TCP, RDMA over TCP, SCTP, and UDP. Network layer 1006 performs frame routing through a subnet or multiple subnets to destination endnodes. Link layer 1008 performs flow-controlled 1020, error checked, and prioritized frame delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

As discussed above, the present invention provides a mechanism for managing a receive queue in a split stack in order to reduce the processing overhead in host processors. An Upper Layer Protocol (e.g. socket) library creates Work Queues (WQ) and Completion Queues (CQ) that are utilized by an Internet Protocol Suite Offload Engine (IPSOE) and the Upper Layer Protocol (ULP) to transfer information and carry out send operations. As consumers initiate send operations, Work Queue Entries (WQE) are created by the ULP and written to the Send Work Queue (SWQ). The ISPOE is notified of a new entry to the SWQ and it subsequently reads this entry, which contains pointers to the data that is to be sent. After the data is sent and acknowledgements are received, the IPSOE creates a Completion Queue Entry (CQE) that is written to the CQ. The CQE includes a Work Request ID that associates a given WQE to a CQE. After the CQE is written, the ULP subsequently processes the entry and removes it from the CQ, freeing up a space in both the WQ and CQ. The number of entries available in the SQW are monitored by the ULP so that it does not overwrite any valid entries. Likewise, the IPSOE monitors the number of entries available in the CQ.

Figure 11:
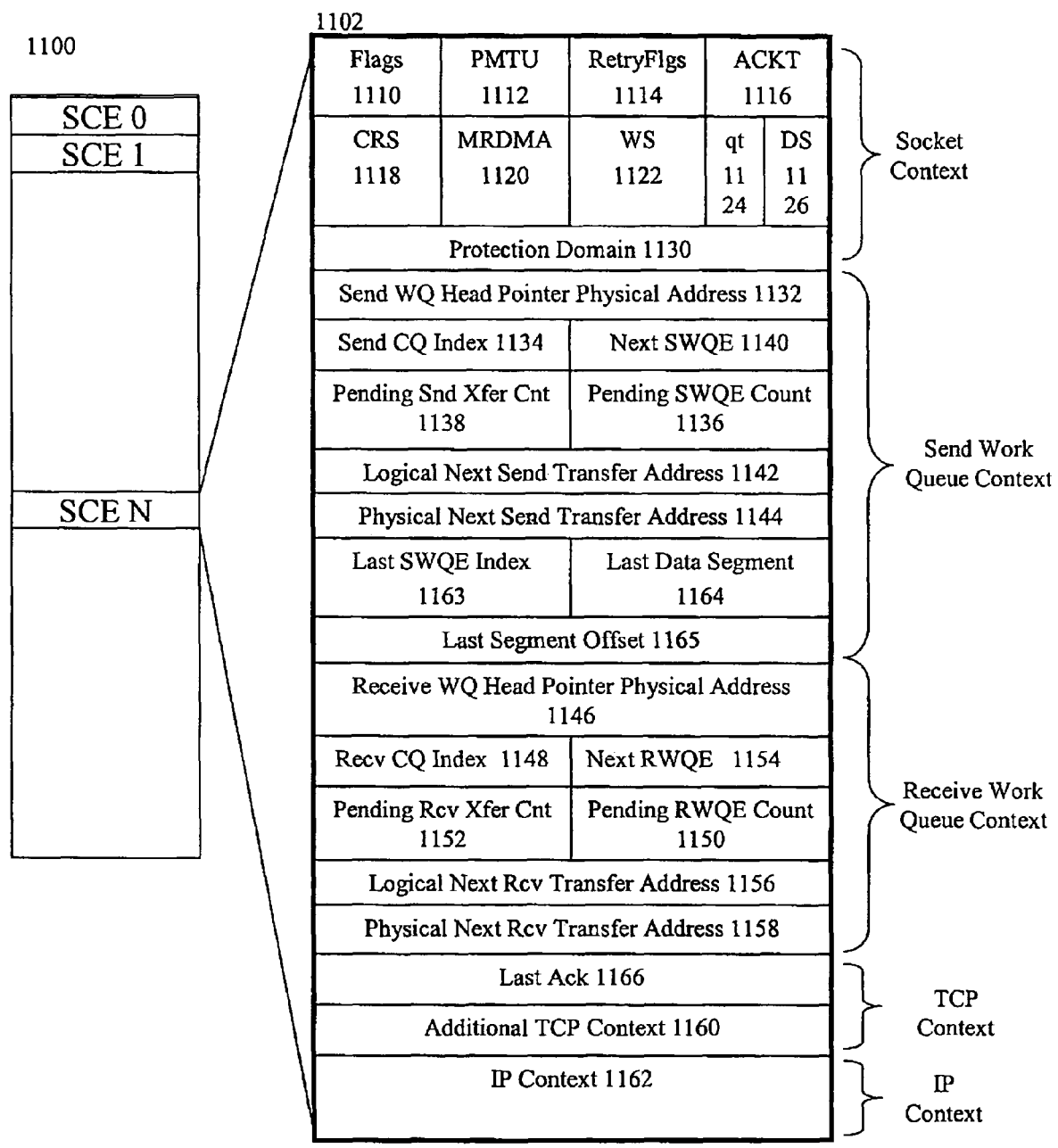
FIG. 11 is an exemplary diagram that depicts the contents of the socket context entry created for a given socket in accordance with the present invention.

FIG. 11 is an exemplary diagram that depicts the contents of an entry in a Socket Context Table in accordance with the present invention. The Socket Context Table 1100 contains a Socket Context Entry (SCE) 1102 for each work queue pair (QP). These entries contain many fields that are broken up into the Socket Context (SC), the Send Work Queue Context (SWQC), Receive Work Queue Context (RWQC), Additional TCP Context, and IP Context.

The Socket Context includes Flags 1110, which contain the state of the QP, the IP version being utilized, and the port number of the QP. The state of the QP is set by the IPSOE. The IP version and port number of the QP are set by the Consumer. The Path Maximum Transfer Unit (PMTU) field 1112 contains the maximum data payload transfer size. The Retry Flags 1114 include the number of times a WQE is retried must be retried by the IPSOE and the current number of retries that have been attempted. The latter is used by the IPSOE to keep track of the number of times the IPSOE has actually retried the WQE. The ACKT (Acknowledgement Timeout) field 1116 is the amount of time the IPSOE will wait for an acknowledgement (ACK) before marking the TCP Segment associated with the ACK as lost.

The Window Size (WS) field 1118 contains the outbound TCP/IP and inbound TCP/IP window sizes, each in number of bytes, for the connection. The Maximum Remote Direct Memory Access (MRDMA) field 1120 is the maximum number of outstanding RDMA Read Requests from the remote socket. The pending receive count (PRC) field 1122 is the number of receive packets that are pending acknowledgements (ACKs). The Queue Pair Type (QT) field 1124 describes the type of service associated with the QP (e.g. Sockets, iSCSI, DAFS, etc . . . ). The Data Segments (DS) field 1126 is the maximum number of data segments per WQE. The protection domain (PD) field 1130 identifies the Protection Domain-associated with the ULP (in one embodiment, it is set to the process ID and is used to ensure that the current operations have authority to access the memory region being read).

The send and receive work queue contexts contain similar data except that they point to different queues. The Receive Work Queue Head Pointer Physical Address field 1146 points to the head of the circular work queue for receive operations. The ULP writes to the head of the RWQ when a send is initiated. The Receive CQ Index field 1148 is the index into the send completion queue for the associated QP. The Pending RQWE Count 1150 is the number of pending RWQE's in the RWQ. The Pending Receive Xfer Count field 1152 is the number of pending receive operations. The Next RWQE field 1154 is a pointer to the next RWQE in this RWQ to be processed. Each RWQE contains a list of Data Segments. For RDMA, each of the Data Segments contains a Steering Tag (STag), Virtual Address and Length. The IPSOE uses the STag to translate the Virtual Address into a Physical Address. The Logical Next Send Transfer Address 1142 and Physical Next Send Transfer Address 1144 are the virtual and physical addresses (respectively) immediately following the last outbound transfer as translated via the IPSOE's memory translation and protection table.

The send work queue context has fields that are analogous to those in the receive work queue context, as represented in FIG. 11 as elements 1132-1165.

The TCP Context 1160 and IP Context 1162 contain information regarding the type of TCP and IP connections that are being utilized as transport mechanisms.

Figure 12:
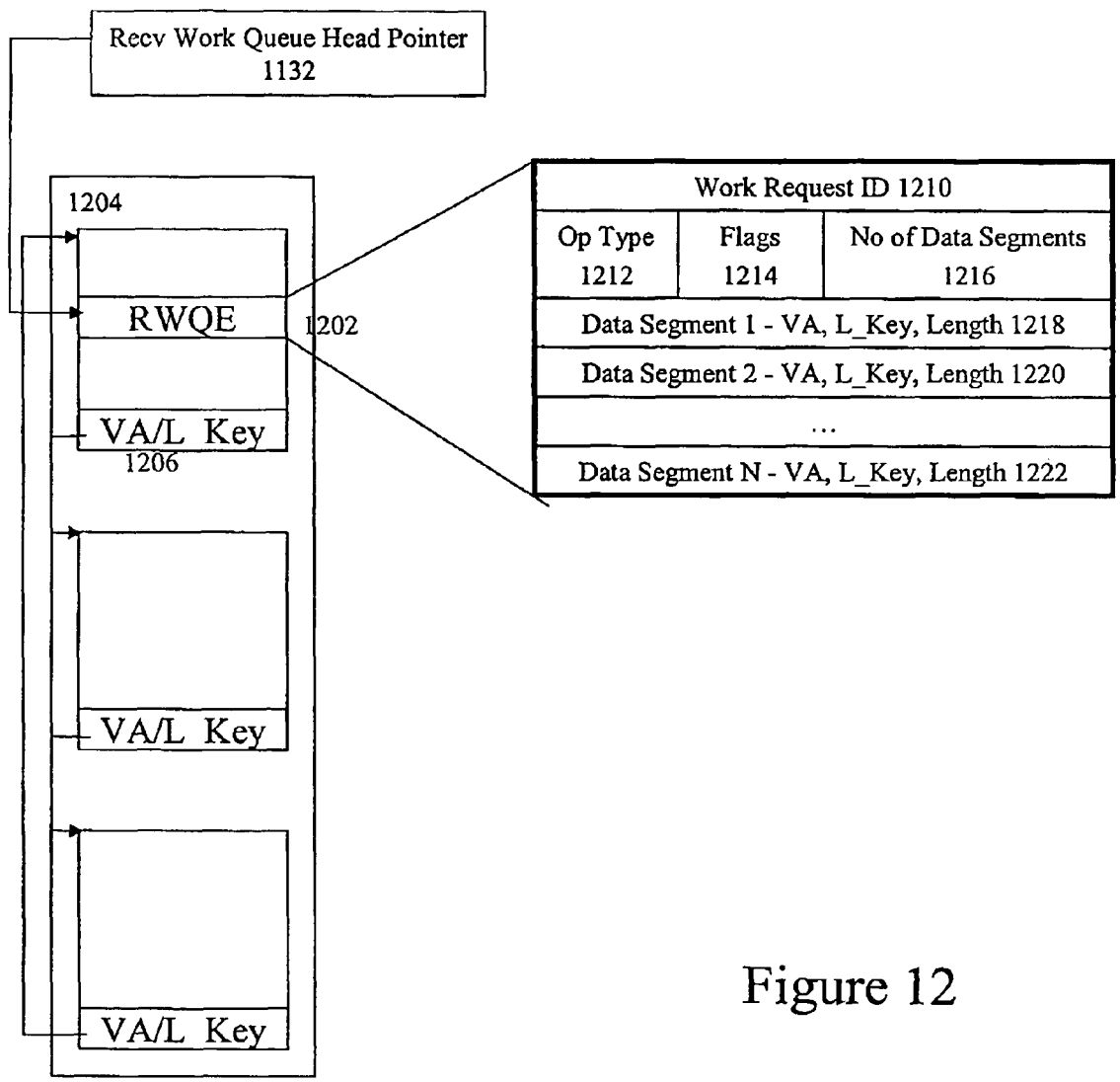
FIG. 12 is a diagram of an exemplary Work Queue Element list and details of the Work Queue Element Entries in accordance with the present invention.

When a receive operation is initiated, the ULP creates one or more RQWE's 1202 that are written to the RWQ pointed to by the RWQ Head Pointer 1146, as shown in FIG. 12. The RWQ 1204 is a linked list of pages of RWQEs. The last entry 1206 in each page is a pointer containing the physical address to the next page of RWQEs.

When the RWQ is created, the initial RQW free space is set in a variable maintained by the ULP, referred to as the "RWQ Credit Count". An RWQ Credit corresponds to one RQWE. As long as there is space in the RWQ (i.e. RQW Credit Count is non-zero), RWQE's can be added to the head of the list pointed to by the RWQ Head Pointer 1146. After some number of RWQE's have been added to the RWQ, the ULP notifies the IPSOE that it has done so via an "RWQ doorbell", and then clears the RQW Credit Count. In a preferred embodiment, a doorbell is a memory mapped I/O operation (MMIO). The number of RWQE's added to the RWQ are indicated to the IPSOE in the RWQ doorbell. The IPSOE adds this count to the Pending RQWE Count 1150, to track the number of pending RWQE's in the RWQ.

Returning to FIG. 12, an enlarged view of the RWQE 1202 is shown in the box having fields 1210-1222. As shown in FIG. 12, the RWQE 1202 includes a Work Request ID field 1210 which is an identifier that is used to associate WQE's with eventual CQE's. The Op Type field 1212 is the operation type. Operation types include: Send, Send with Solicited Event, RDMA Write, RDMA Read, or a Memory (e.g. Bind Memory Window) Operation. The Flags 1214 include information such as: Signaled Completion requested; Immediate Data present; and Fence requested. If the ULP requested Signaled Completion, then a Work Completion (WC) will be returned by the IPSOE when the SWQE completes. If Immediate Data is requested, then the SWQE contains data that the IPSOE must send as Immediate Data on the outbound transfer. Finally, if the RWQE contains a Fence, then the IPSOE must wait for the RWQE to complete, before processing the next RWQE. The Fence operation can be used for Memory and RDMA Read Operations.

The Number of Data Segments field 1216 is the quantity of Data Segments that are to be transmitted. Each Data Segment 1218-1222 contains a STag, Virtual Address, and Length. The IPSOE's Memory Translation and Protection Table uses these 3 fields to access the data referenced by the data segment. In an iSCSI environment this list of addresses is replaced by a pointer to the iSCSI command which will contain the destination IP address and port number along with a list of physical addresses of data that is to be transmitted.

Figure 13:
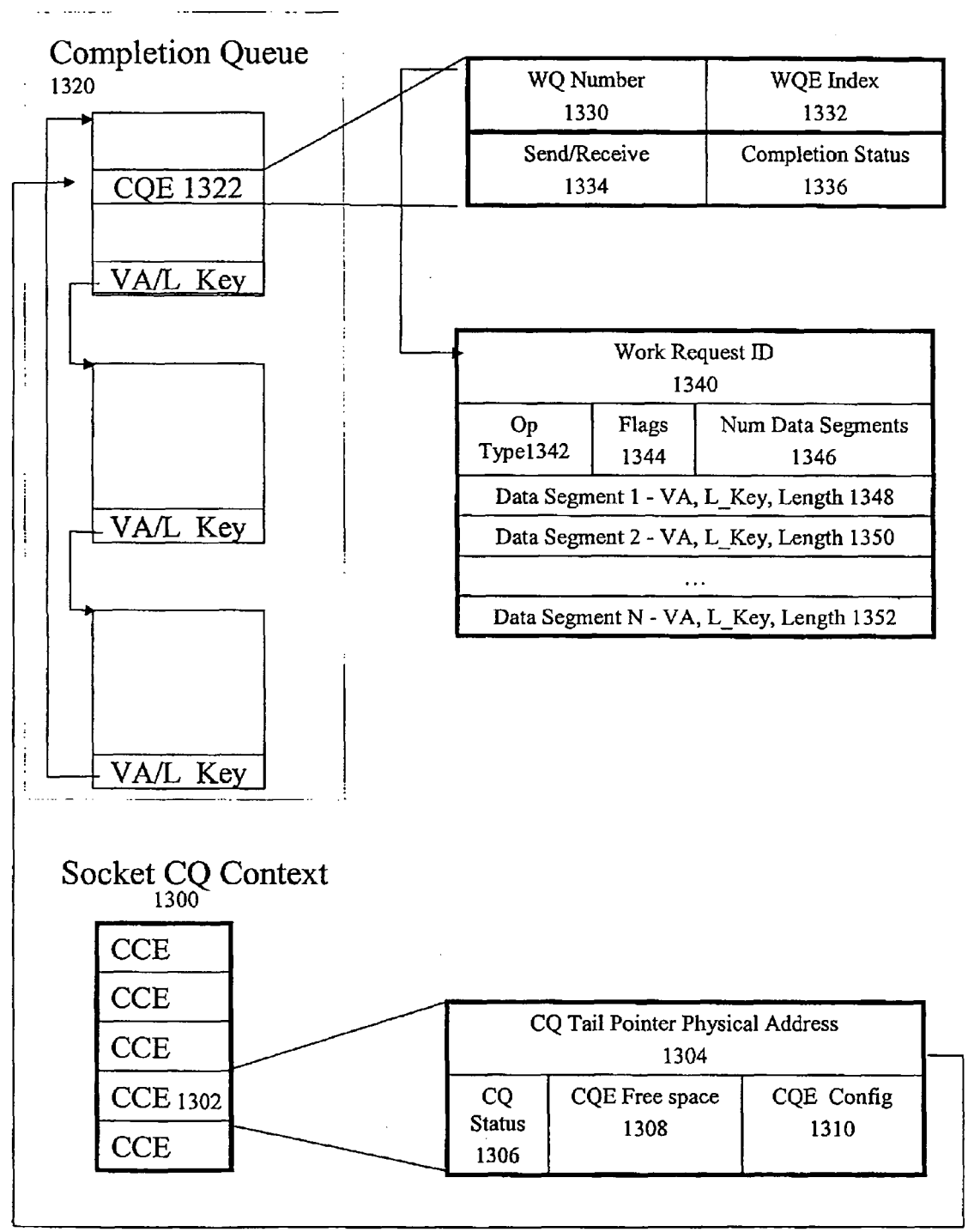
FIG. 13 is a diagram of an exemplary Completion Queue Context and details of the Completion Queue Element Entries in accordance with the present invention.

After the data pointed to by the list of addresses in the RWQEs is transferred by the IPSOE to host memory, the IPSOE must notify the consumer that the work is completed. This is carried out through the use of a completion queue (CQ). CQ's are created by the ULP for each IPSOE. At the time of creation, the size of the CQ is set (i.e. number of CQE's the CQ can hold). FIG. 13 shows the CQ context along with the detail of the CQE. The Socket Completion Queue Context Table 1300 contains Completion Context Entries (CCE) such as 1302 associated with a given WQ. Each CCE 1302 contains a CQ Tail Pointer Physical Address field 1304 which is a pointer to the address of an entry such as 1322 in the circular linked list, which is the CQ 1320. This is a linked list of CQE pages where the last entry in each page is a pointer to the next page of the list.

Each CQE contains a pointer to the send operation that completed. This is accomplished by utilizing a WQ Number field 1330 and a WQE index field 1332 that point to the WQE that has completed. The Send/Receive field 1334 of the CQE identifies the type of operation (Send WQE or Receive WQE) that completed and the Completion Status field 1336 contains information as to whether the WQE completed successfully or unsuccessfully.

The WQE that is pointed to is shown in 1340-1352. For a CQE that is associated with a Send WQE, all the fields contained in the Send WQE are contained in the CQE. Similarly, for a CQE that is associated with a Receive WQE, all the fields contained in the Receive WQE are contained in the CQE. The Work Request ID field 1340 is a 64-bit identifier that is used to associate this completion queue entry back to a specific WQE.

Figure 16:
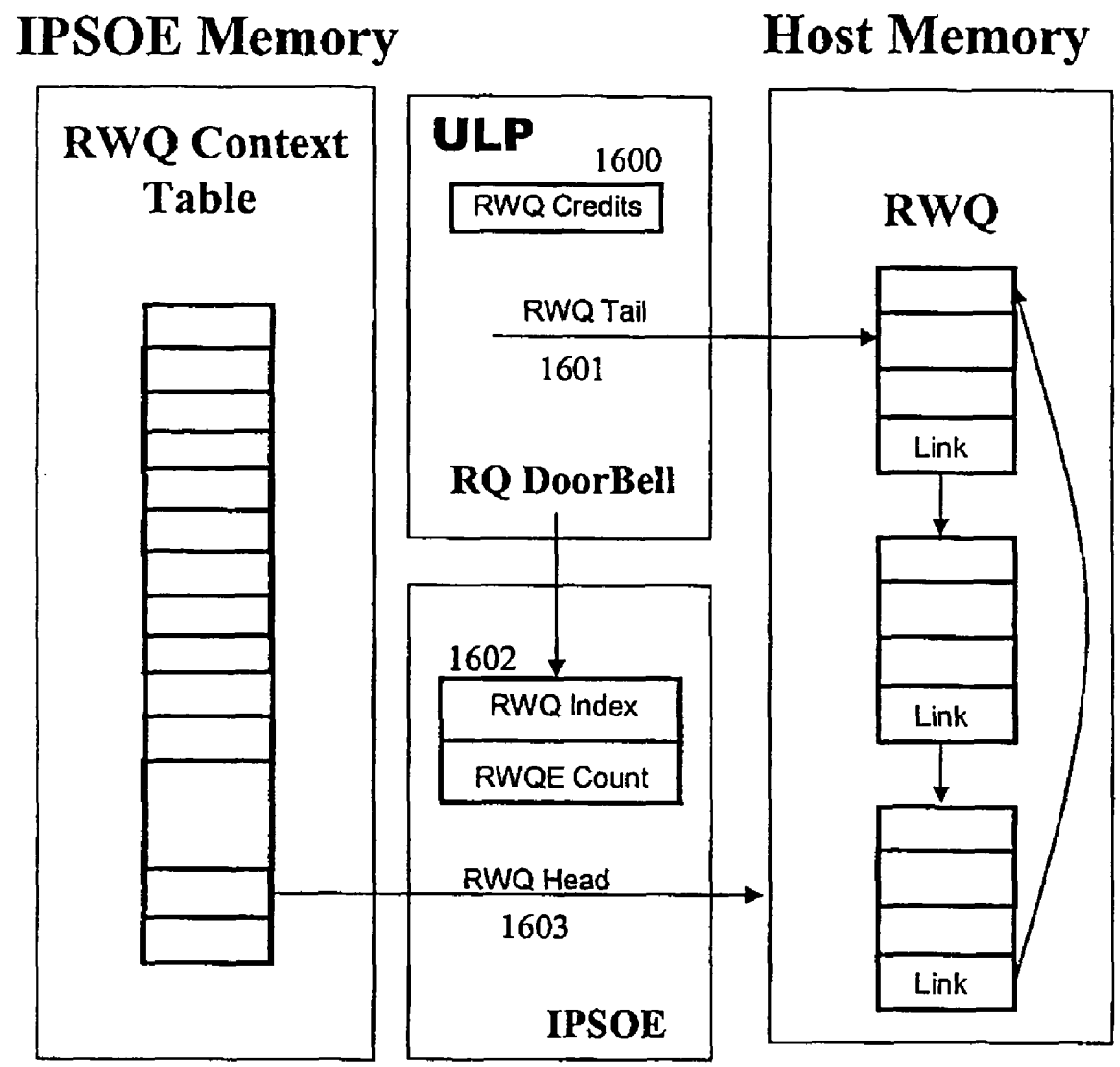
FIG. 16 is an exemplary diagram illustrating a receive queue doorbell mechanism for informing the IPSOE of a receive work queue entry count.

As operations complete, the IPSOE writes to the tail of the CQ using the CQ Tail Pointer 1304, assuming the CQE Free Space count 1308 in the Socket CQ Context 1300 indicates that there is available free space. CQE Free Space is a count of the number of free entries in the CQ. If no space is available CQ (i.e. CQE Free Space is zero) then an interrupt will be issued up to the ULP. At that point the ULP may increase the size of the CQ and notify the IPSOE how many entries have been added to the CQ. The IPSOE responds by adjusting the CQE Free Space count up by the indicated amount. The ULP keeps track of the last CQE that it read and when the next entry becomes valid. The ULP ensures that the operation completed successfully and removes CQE from the head of the CQ by invalidating the entry and advancing a software CQ head pointer that it maintains. The ULP also maintains counts of the number of CQE's it has removed from the CQ, both in total, and on a per WQ basis. The per WQ counts are maintained in "RWQ Credit Count" variables 1600, as shown in FIG. 16, managed by ULP software. RWQ Credit Count conservatively indicates to the ULP how much free space there is in the corresponding RWQ. When the ULP issues an RWQ Doorbell 1602 to the IPSOE, it passes the corresponding RWQ Credit Count to the IPSOE in the doorbell as an RWQE Count, and then clears the RWQ Credit Count.

Figure 17:
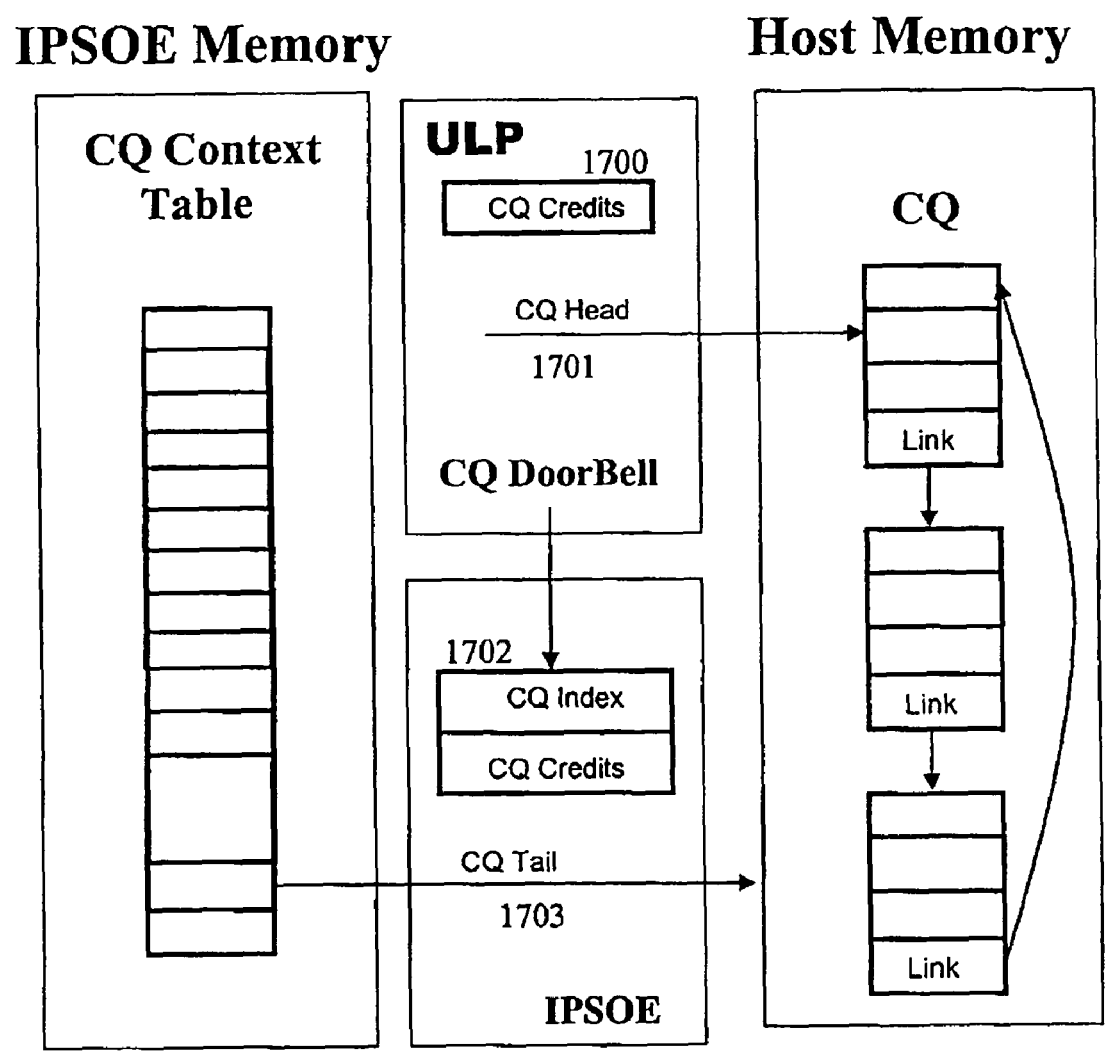
FIG. 17 is an exemplary diagram illustrating a completion queue doorbell mechanism for informing the IPSOE of completion queue credits.

The total number of CQE's the ULP removes from a CQ are maintained in a "CQ Credit Count" variable 1700, as shown in FIG. 17, managed by the ULP in software. The ULP indicates to the IPSOE how many CQE's it has removed from a CQ by passing the CQ Credit Count to the IPSOE in a "CQ Doorbell" 1702. A CQ doorbell is an MMIO like the RWQ Doorbell. However, instead of indicating how many RWQE's have been added to a RWQ, a CQ doorbell indicates how many CQE's the ULP has removed from a specified CQ. When the ULP issues a CQ Doorbell to the IPSOE, it passes the CQ Credit Count to the IPSOE in the doorbell, and then clears the CQ Credit Count. The IPSO adds the CQ Credits to the CQ Free Space count 1308 of the Socket CQ Context 1300 (that is also specified in the CQ doorbell). When the IPSOE adds one or more CQE's to the tail of a CQ 1703, it decreases the CQ Free Space Count by that amount. Hence the CQ Free Space count conservatively indicates to the IPSOE the amount of free space in the corresponding CQ.

Note the implicit flow of RWQ and CQ Credits between the ULP and the IPSOE. As the ULP consumes CQEs from a CQ, it acquires CQ and RWQ Credits. As the ULP issues RWQ Doorbells to the IPSOE it consumes RWQ Credits, and implicitly passes them to the IPSOE. The IPSOE in turn implicitly returns RWQ Credits to the ULP as it posts CQE's in a CQ. Conversely, the IPSOE implicitly consumes CQ Credits as it posts CQE's to a CQ. The ULP explicitly returns CQ Credits to the IPSOE in CQ Doorbells.

Figure 14:
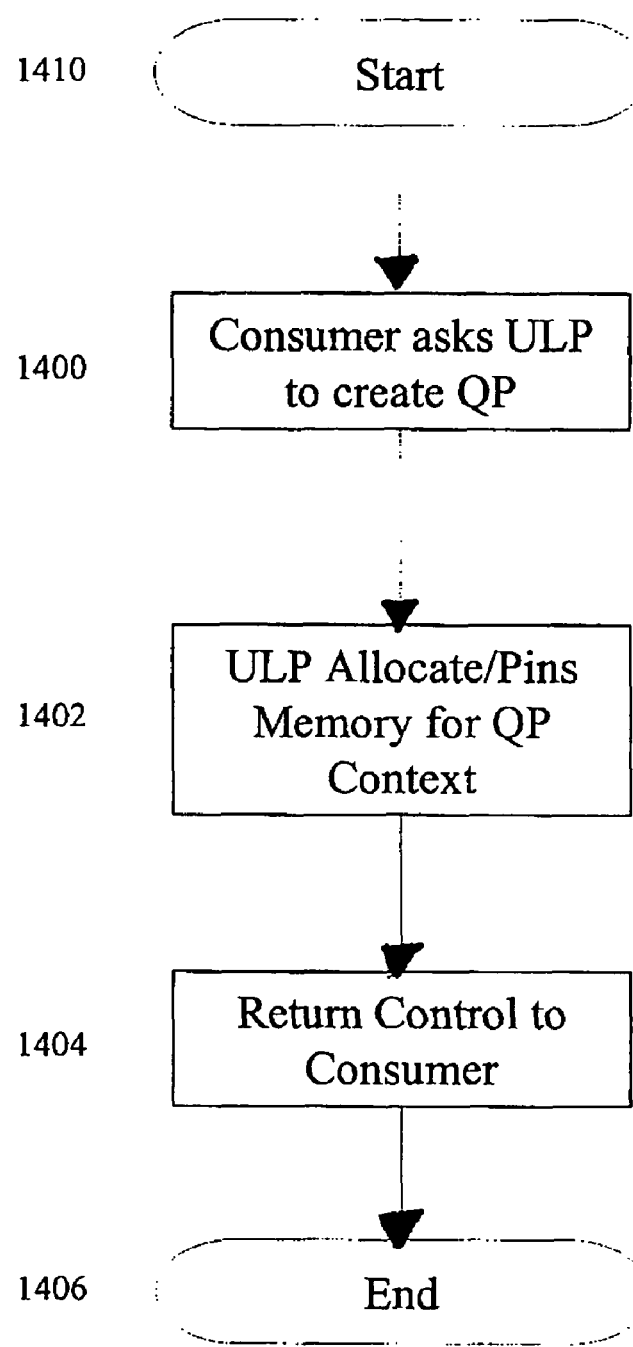
FIG. 14 is a flowchart outlining an exemplary operation for creation of a queue pair in accordance with the present invention.

Now turning to FIG. 14 which is a flowchart that outlines an exemplary process for creating a queue pair. Step 1410 starts the flowchart. The consumer initiates the creation of queue pair by calling the ULP to create a queue pair (step 1400). 1402 the ULP then allocates and pins memory for the queue pair context or socket context as depicted in FIGS. 11 and 12 (Step 1402). Once the QP is created including the setting attributes such as the number of WQEs allowed in the QP, then control is returned to the consumer (step 1404) and the process ends (step 1406).

Figure 15:
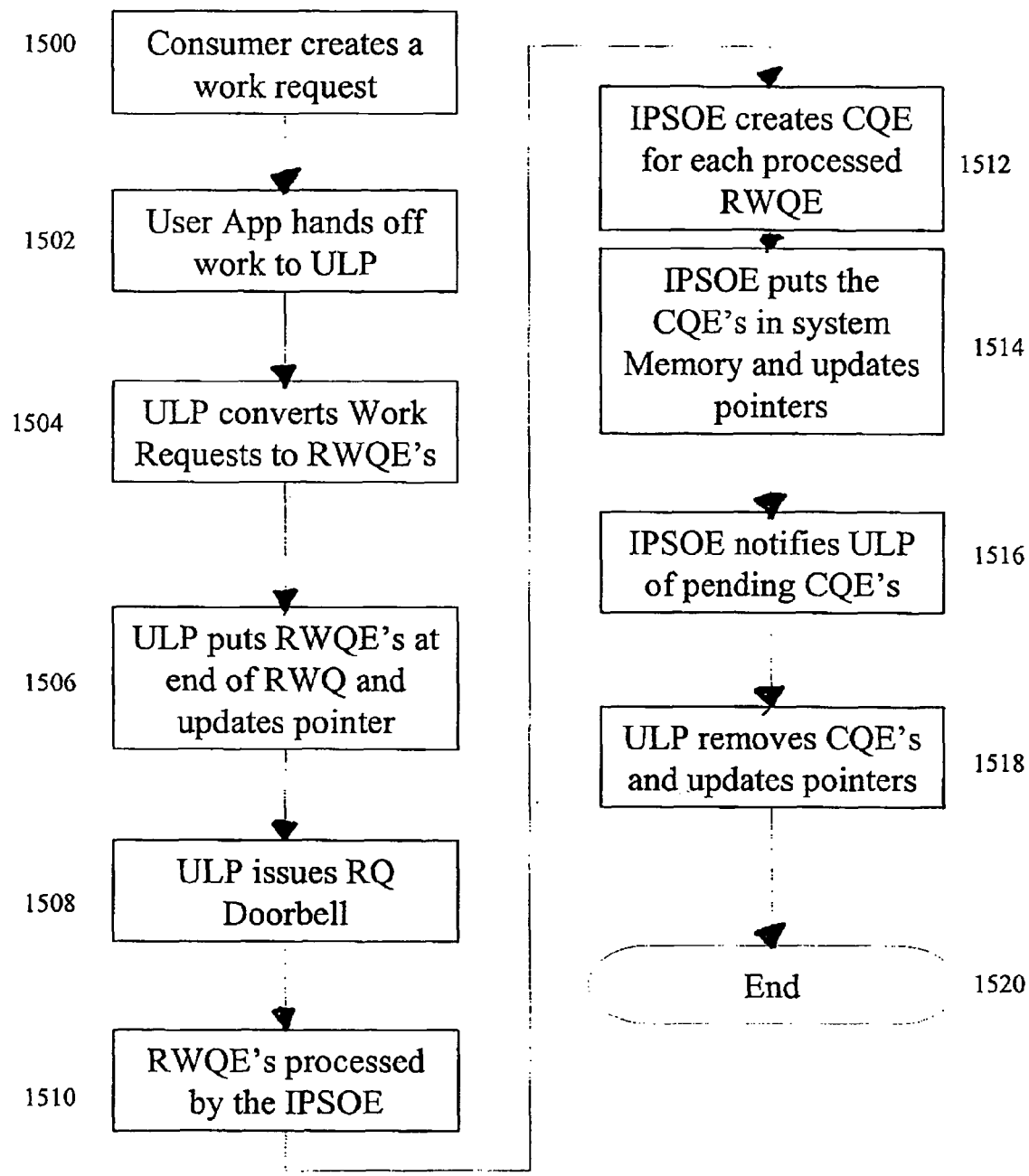
FIG. 15 is a flowchart outlining an exemplary operation of a receive operation in accordance with the present invention.

FIG. 15 is a flowchart outlining an exemplary operation of the present invention for send transactions. As shown in FIG. 15 the consumer creates a number of send work requests 1500 and hands them off to the ULP 1502. The ULP converts the work requests into SWQE's 1504 as depicted in FIG. 12. The ULP writes the RWQE's 1202, to the address pointed to by the Receive WQ Head Pointer Physical Address 1132 and then updates this pointer 1506. The ULP notifies the IPSOE via a RWQ Doorbell how many RWQE's were posted to the RWQ, and clears the associated RWQ Credit Count.

The RWQE is processed by the IPSOE hardware by transmitting the data in the data segments pointed to by the Data Segment Addresses 1218-1222 within the RWQE 1202 1510. Once the entire RWQE has been processed, then the IPSOE creates a CQE 1512, and decrements the Pending RWQE Count. The IPSOE writes the CQE into the CQ at the address pointed to by the CQ Tail Pointer Physical Address 1304, updates this pointer to the next available CQE 1514, and decrements the CQE Free Space count. The IPSOE then notifies the ULP of a new CQE 1516. This can be done by several methods with one implementation being an interrupt polling mechanism between the IPSOE and the ULP. Once notified, the ULP processes the CQE's it removes from the CQ and updates the corresponding CQ and RWQ Credit counts 1518. At this point the entire send operation has ended 1520.

Figure 18A:
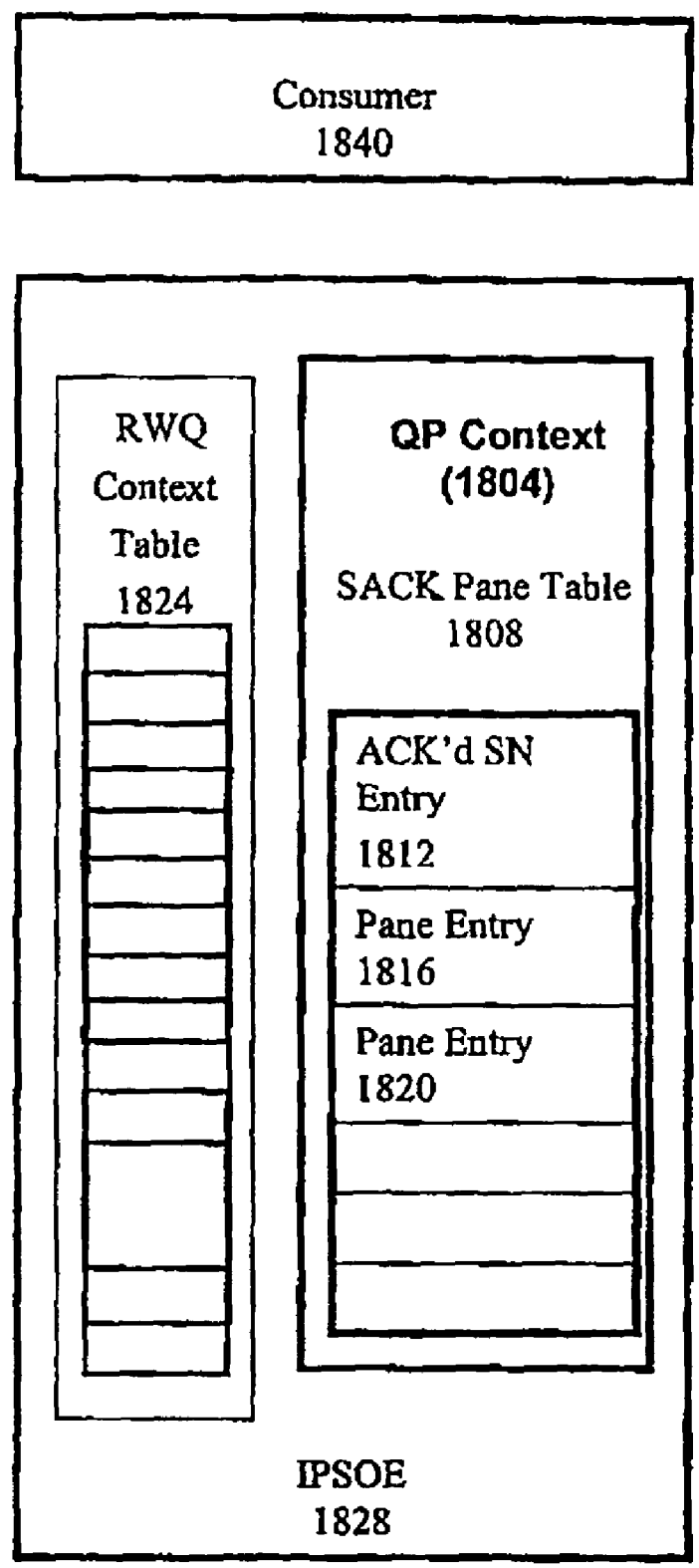
FIGS. 18A and 18B illustrate a diagram and flowchart, respectively, depicting the initialization of the Selective Acknowledgement Table in accordance with the present invention.
Figure 18B:
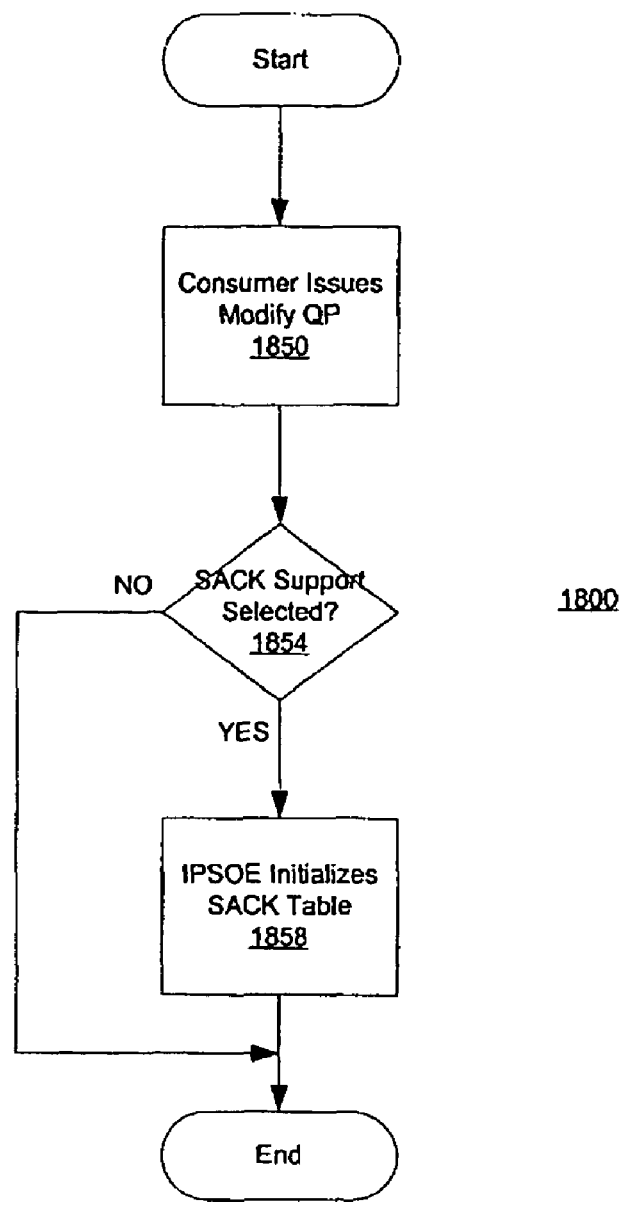

FIGS. 18A and 18B illustrate a diagram and flowchart, respectively, depicting the initialization of the TCP Selective Acknowledgement (SACK) Table in accordance with the present invention. The SACK Table Initialization flowchart 1800 is performed when the Consumer, such as Consumer 1840 invokes a Modify QP. As shown in FIG. 18B, the Consumer issues a Modify QP to the IPSOE (step 1850), such as IPSOE 1828. The IPSOE determines if Modify QP input modifiers have selected SACK support to be enabled on the QP (step 1854). If SACK support is not enabled on the QP, the IPSOE exits the flowchart. If SACK support is enabled, the IPSOE initializes the SACK table (step 1858), such as SACK Pane Table 1808 in IPSOE 1828. The IPSOE sets the number of entries in the SACK table to the number of SACK entries selected by the Modify QP verb.

The first entry (i.e. the ACK'd SN entry 1812) in the table contains these fields: the last Acknowledged TCP Sequence Number; the current RQ, such as RQ 1824, WQE, and the offset into the WQE. Each subsequent entry in the table, such as Pane Entry 1816 and 1820, represents a Pane Entry and contains these fields: the starting SN (TCP Sequence Number) represents the first byte successfully received and SACK'd, the ending SN represents the last byte successfully received and SACK'd, the current WQE associated with the ending SN, and the offset into the WQE associated with the ending SN. All these subsequent entries are initialized to zero. At this point the IPSOE exits the flowchart.

Figure 19:
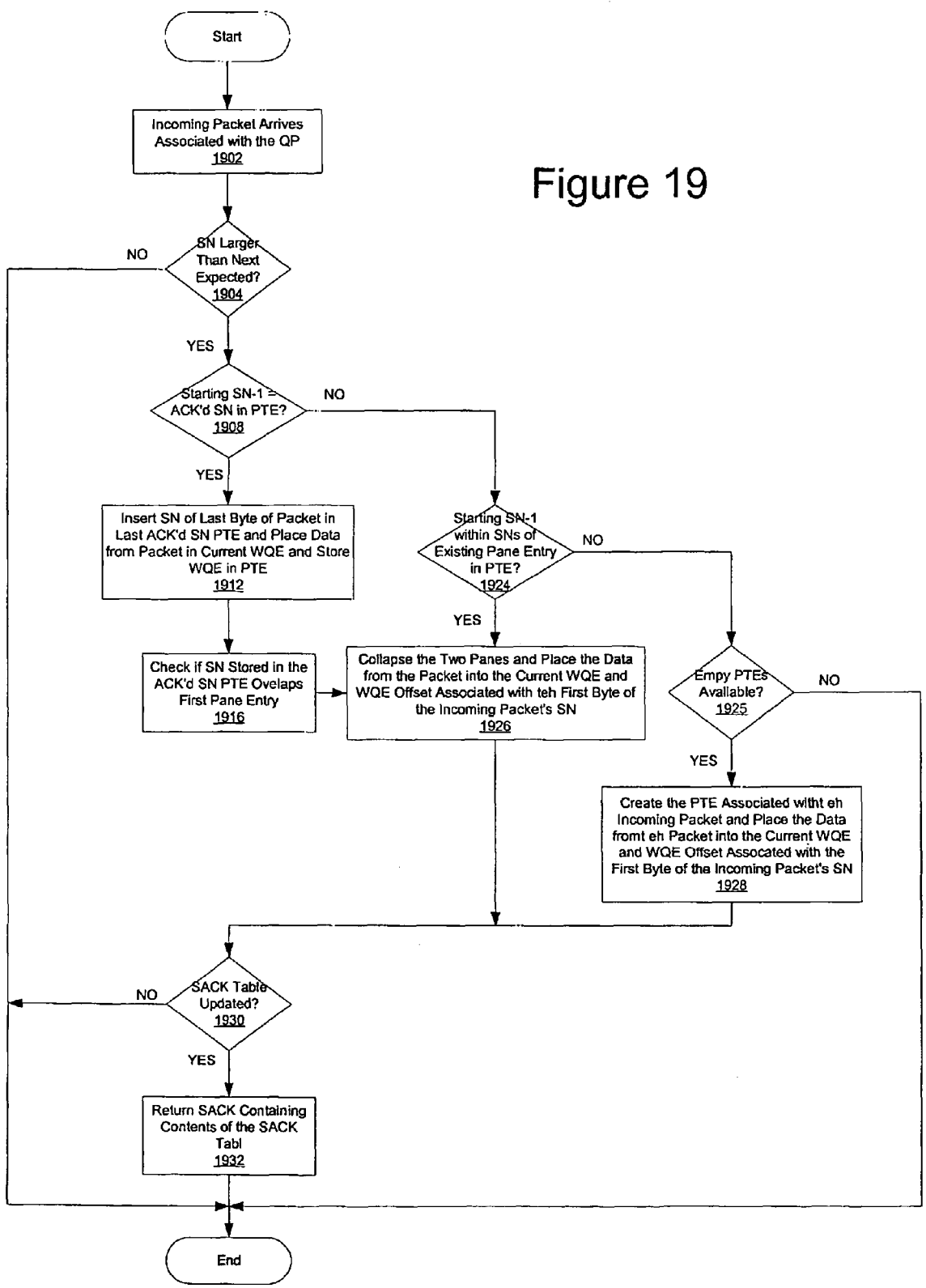
FIG. 19 is a flowchart outlining the Selective Acknowledgement processing performed by the IPSOE on incoming TCP/IP Segment is processed in accordance with the present invention.

FIG. 19 is a flowchart outlining the Selective Acknowledgement processing performed by the IPSOE when an incoming TCP/IP Segment is processed in accordance with the present invention. The SACK Incoming Packet Processing flowchart 1900 is performed when an incoming packet arrives that is associated with an IPSOE QP that has SACK enabled (step 1902). The IPSOE determines if the incoming packet contains a TCP Sequence Number (SN) larger than next expected, but within the TCP Window (step 1904). If not, the packet is dropped and the operation ends. If so, the IPSOE compares the starting SN-1 of the incoming packet to the ACK'd SN in the Pane Table Entry (PTE) (step 1908).

If the starting SN-1 of the incoming packet is equal to the ACK'd SN in the Pane Table Entry (PTE), the IPSOE: inserts the SN corresponding to the last byte of the packet in the last ACK'd SN PTE and places the data from the packet into the current WQE and WQE offset stored in the PTE (step 1912). The IPSOE then checks if the SN stored in the ACK'd SN PTE overlaps with the first Pane entry (step 1916), the operation continues to step 1926 where the IPSOE: collapses the two panes and places the data from the packet into the current WQE and WQE offset associated with the first byte of the incoming packet's SN (step 1926).

If the SN-1 of the incoming packet is not equal to the ACK'd SN in the PTE (step 1908), the IPSOE compares the starting SN-1 of the incoming packet to the Pane Entries in the Pane Table Entry (PTE) and determines if SN-1 is within the SNs of an existing Pane Table Entry (step 1924). If it is not within the SNs of an existing Pane Entry, the operation continues to step 1925. If it is within the SNs of an existing Pane Table Entry, the operation continues to step 1926 where the IPSOE: collapses the two panes and places the data from the packet into the current WQE and WQE offset associated with the first byte of the incoming packet's SN (step 1926).

If no empty PTEs are available (step 1925), the packet is dropped and the operation terminates. If an empty PTE is available, the IPSOE: creates the PTE associated with the incoming packet and places the data from the packet into the current WQE and WQE offset associated with the first byte of the incoming packet's SN (step 1928). After either the execution of steps 1926 or 1928, the operation continues to step 1930.

If the SACK table was updated (step 1930), the IPSOE sends a SACK containing the contents of the SACK table to the source of the incoming packet (step 1932) and the operation terminates. Otherwise, the operation simply terminates.

The remaining figures in this patent describe the IPSOE virtualization mechanisms. The basic philosophy used by these mechanisms consists of the following: During IPSOE Driver and Library development, the IPSOE Driver and Library are each segmented into: an IPSOE Hosted Server Driver, which runs in the Hosted Server; an IPSOE Hosted Server Library, which runs in the Hosted Server; and an IPSOE Hosting Partition Driver, which runs in the Hosting Partition (HP). A Software Queue Pair is provided between IPSOE Hosted Partition and the IPSOE Hosting Partition (HP). A single physical server is partitioned into multiple virtual servers. Each Hosted Server is a virtual server running an operating system instance on a single physical server. The Hosting Partition is also one of these virtual servers that includes the mechanism described in this docket.

The HP uses an IPSOE Resource Management Table (RMT) to assign physical IPSOE resources to the virtual Hosted Servers. Each entry of the IPSOE RMT contains the resources assigned to the HS associated with the entry. After the entry is made, the HS can access the IPSOE and use the IPSOE resources allocated in the RMT. Through the use of the Software Queue Pair and the Resource Management Table the HP allows a single IPSOE to be shared between multiple Hosted Servers.

The IPSOE Hosted Partition Driver/Library places IPSOE operations on the IPSOE Software Send Queue. The operations consist of all standard and vendor unique IPSOE verbs. All IPSOE operations performed by the Hosted Server's (HS) Operating System are placed on the IPSOE Software Send Queue and, if necessary, invoke the Hosting Partition through a trap call.

The IPSOE Hosting Partition Driver performs operations posted to the IPSOE Software Send Queue and returns results to the Hosted Partition through the IPSOE Software Receive Queue. The Hosting Partition performs all the operations, including interrupt processing.

The IPSOE uses a Server Domain (SD) field to associate IPSOE QP, CQ, and Memory Translation and Protection Table (TPT) Resources to a virtual Hosted Server (HS). For each HS running on the physical server, the HP allocates an SD on the IPSOE (see FIG. 22). For each IPSOE QP Resource used by the HS, the HP assigns a SD and MAC (Media Access Control) Address Table Entry (MAC Table Entry) to the IPSOE QP (see FIG. 27). For each IPSOE CQ Resource used by the HS, the HP assigns a SD to the IPSOE CQ (see FIG. 26) Resource, respectively. Similarly, for each IPSOE Memory Resource used by the HS, the HP assigns a SD to the IPSOE Memory (see FIG. 28) Resource, respectively.

Figure 26:
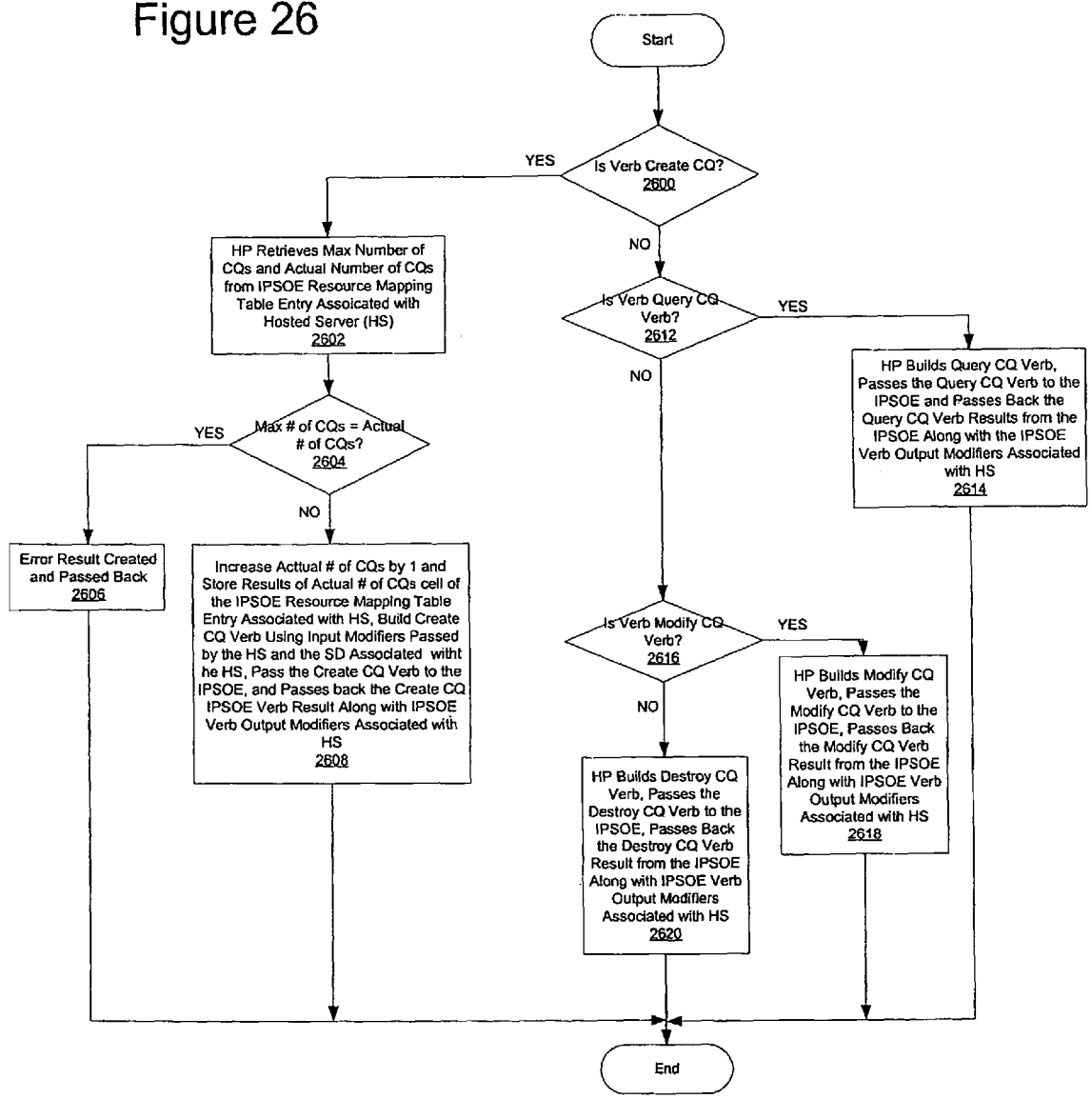
FIG. 26 is a flowchart outlining the CQ Management Verbs (Create, Query, Modify, and Destroy) mechanism in accordance with the present invention.
Figure 27:
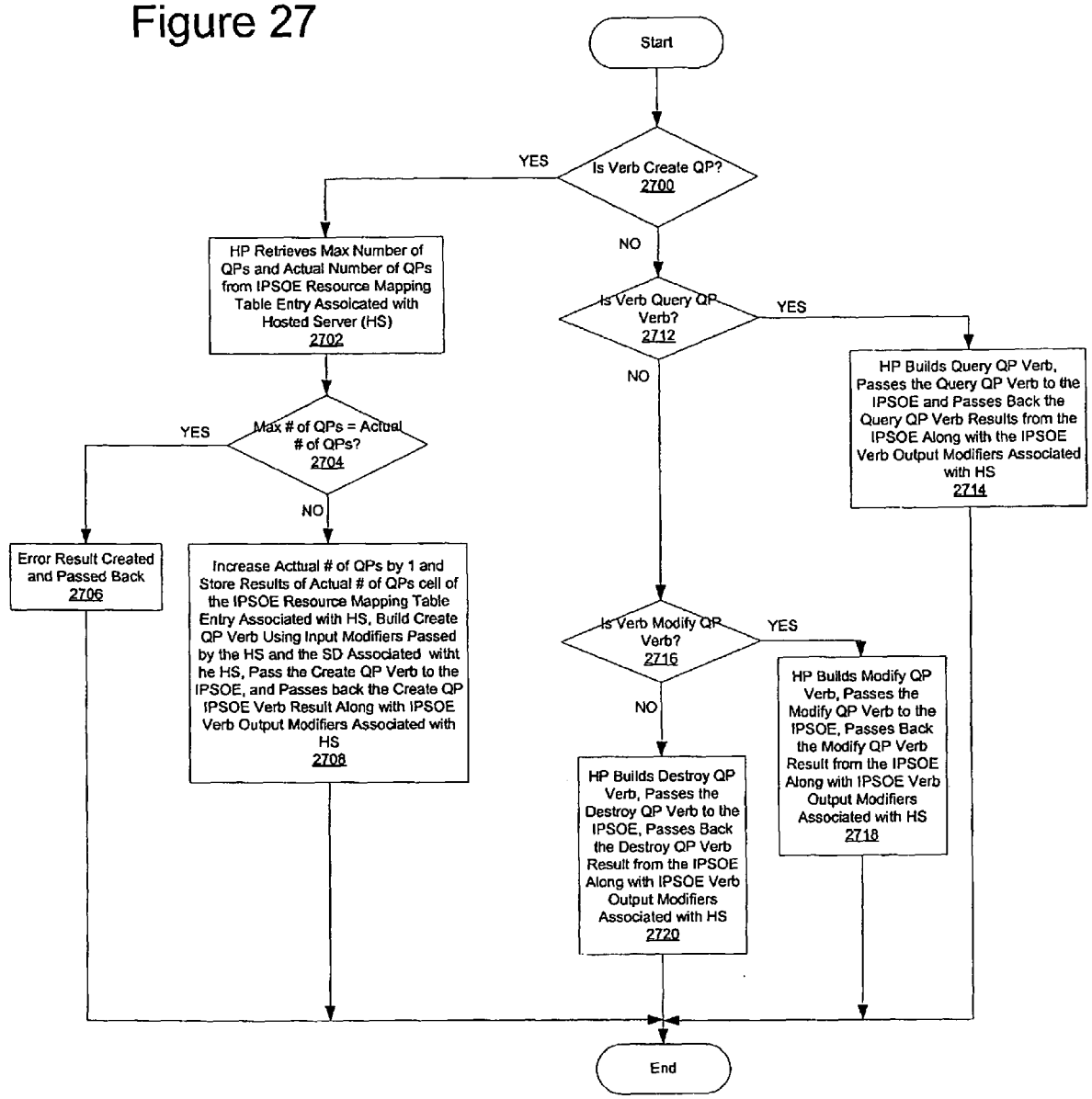
FIG. 27 is a flowchart outlining the QP Management Verbs (Create, Query, Modify, and Destroy) mechanism in accordance with the present invention.
Figure 28:
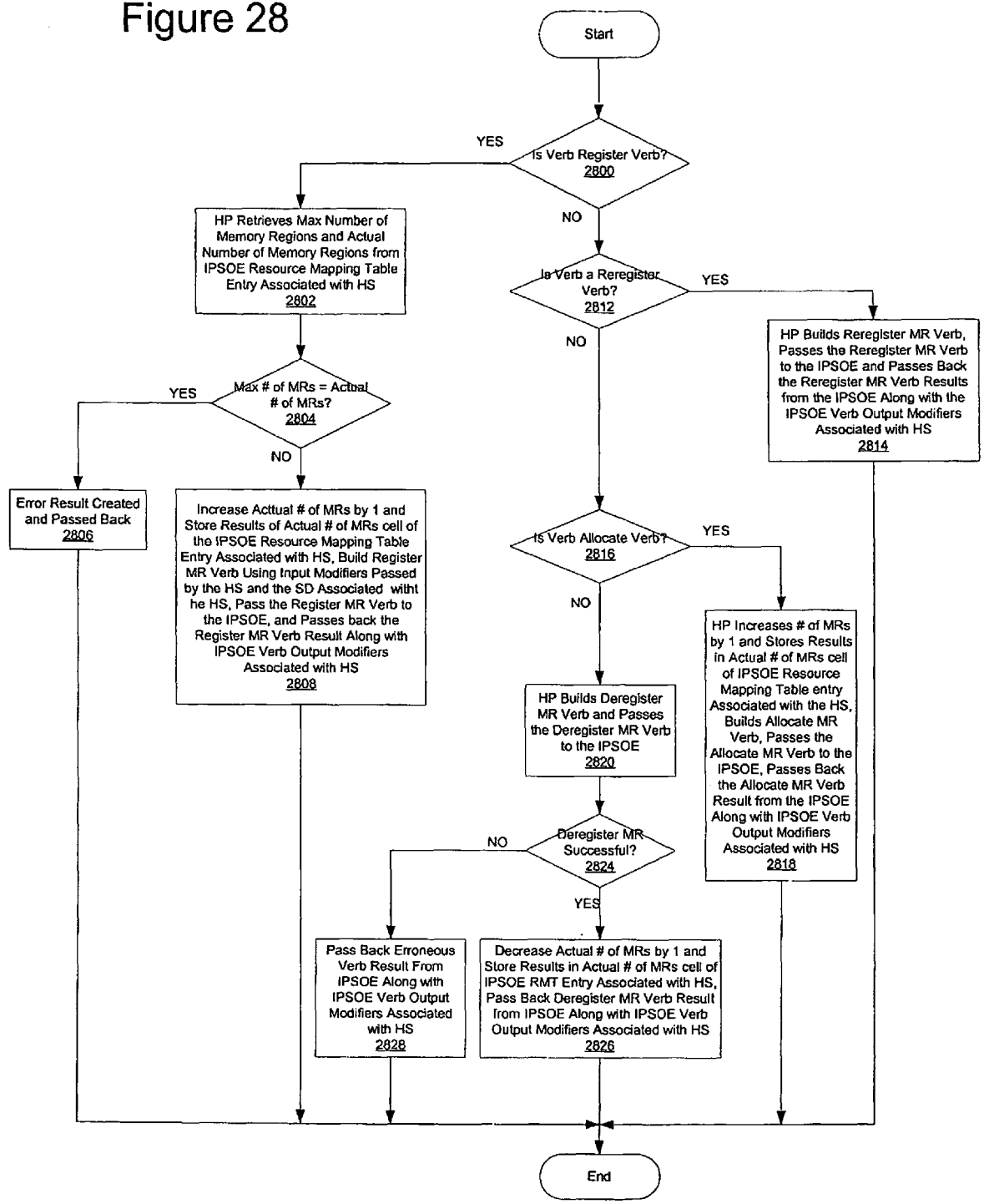
FIG. 28 is a flowchart outlining the Memory Management Verbs (All Registers, All Reregisters, All Allocates, All Deregisters) mechanism in accordance with the present invention.

When the IPSOE performs an operation between a QP and a CQ or Memory TPT Resource, the IPSOE must verify that the SD value matches. When an incoming TCP Segment arrives, the IPSOE must verify that the incoming TCP Segment's destination MCA Address and Port match the MCA Address and Port assigned to the QP referenced by the TCP Quintuple (i.e. the Transport Type, Source Port Number, Destination Port Number, Source IP Address, and Destination IP Address). FIGS. 26, 27, and 28 describe the flowcharts used to associate a SD to a CQ, QP, and Memory TPT, respectively.

For any type of incoming RDMA Protocol Send message, if MAC Table Entry matches, the incoming TCP Segment is indeed associated with the Hosted Server that is assigned to the QP and TCP Segment processing continues. Otherwise TCP Segment processing is terminated. FIG. 32 describes the flowchart used to perform the MAC Address and Port Number verification.

For any type of incoming RDMA Protocol Write or Read message, the Server Domain (SD) stored in the Memory TPT must match the SD stored in the QP that is associated with the incoming TCP Segment and the MAC Table Entry stored in the QP must match the MAC Address and Port Number referenced in the incoming TCP Segment. If both match, the processing continues on the incoming TCP Segment. Otherwise it is terminated. FIG. 32 describes the flowchart used to perform the SD verification.

Figure 30:
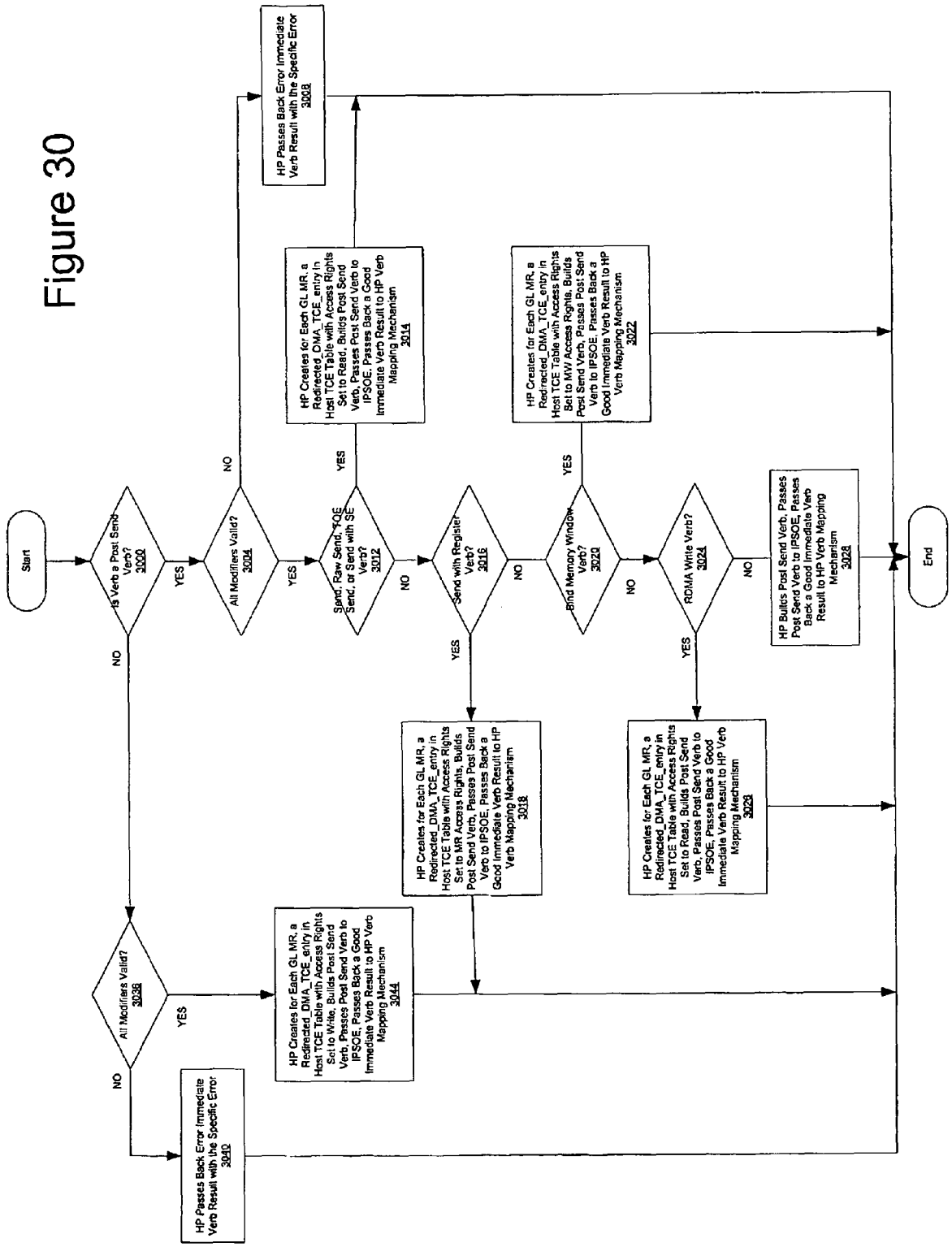
FIG. 30 is a flowchart outlining the Post Send and Post Receive Verbs mechanism in accordance with the present invention.
Figure 31:
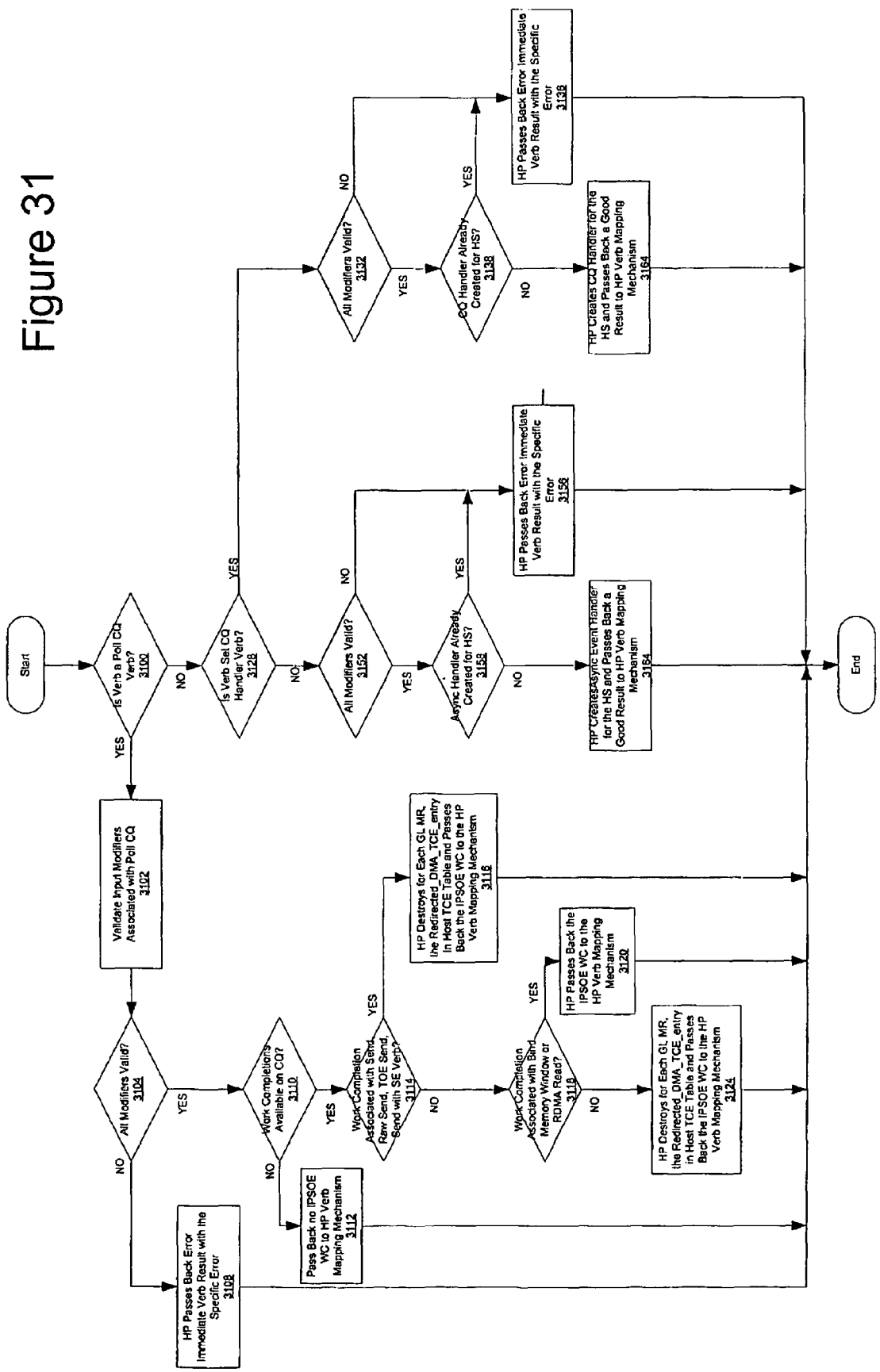
FIG. 31 is a flowchart outlining the Poll CQ, Set CQ Handler, Set Async Event Handler Verbs mechanism in accordance with the present invention.

All IPSOE verb invocations by the Hosted Server are passed through the Hosting Partition. The Hosting Partition performs the actual IPSOE verbs through the necessary programmed I/O operations. FIGS. 24 through 31 describe the flowcharts used: to pass IPSOE verb invocations from the HS to the HP, by the HP to perform the verb invocation, and return the verb results back to the HS. Some IPSOE verb invocations require Direct Memory Access (e.g. Post Send, Post Receive, and incoming RDMAs). For verbs that required Direct Memory Access (DMA), the Hosting Partition sets up the DMAs as Redirected DMAs that directly target the Memory Addresses. When the Redirected DMA is no longer needed, the IPSOE destroys it. FIGS. 30-31 describe the set up and destruction of Redirected DMAs.

Figure 20:
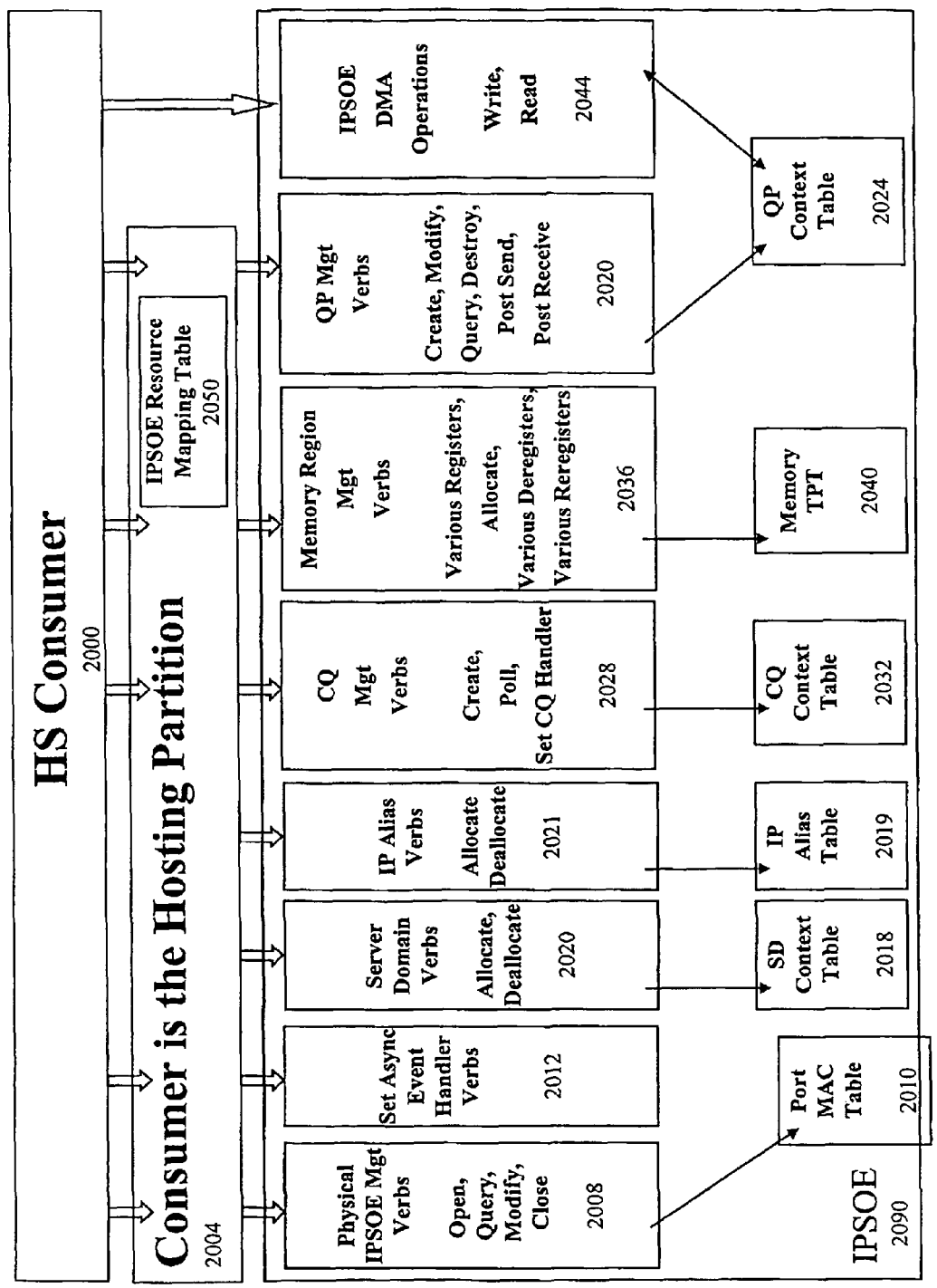
FIG. 20 is an exemplary diagram of the operations supported by the IPSOE and the tables used to maintain state for those operations in accordance with the present invention.

FIG. 20 is an exemplary diagram of the operations supported by the IPSOE and the tables used to maintain state for those operations in accordance with the present invention. All verb invocations by a consumer process running in a Hosted Server's (HS) Operating System, such as HS Consumer 2100, must go through the Hosting Partition (HP), such as HP 2104. The Hosting Partition maintains an IPSOE Resource Mapping Table (RMT), such as IPSOE Resource Mapping Table 2150, which contains the maximum resources available to the HS and the actual resources that have already been allocated to the HS. The IPSOE, such as IPSOE 2190, supports: a set of Physical IPSOE Management Verbs (Open, Query, Modify, Close) 2108; a Set Asynchronous Event Handler Verb 2112; a set of Server Domain (SD) Management Verbs (Allocate, Deallocate) 2116; a set of IP Address Alias (IP Alias) Verbs (Allocate, Deallocate) 2117; a set of CQ Management Verbs (Create, Poll, and Set CQ Handler) 2128; a set of Memory Region Management Verbs (various Register verbs, Allocate, various Deregister verbs, various Reregister verbs) 2136; a set of QP Management Verbs (Create, Modify, Query, Destroy, Post Send, and Post Receive) 2120; a set of IPSOE Direct Memory Access (DMA) Operations (Write and Read) 2144; a Port MAC Table 2110; a SD Context Table 2118; an IP Address Alias (IP Alias) Table 2119; a CQ Context Table 2132; a Memory Translation and Protection Table (TPT) 2140; and QP Context Table 2124. All the verbs are familiar to those experienced in RDMA technology (Virtual Interface Architecture standard, InfiniBand standard, and, more recently, RDMA over IP standard), except for the SD Management and the IP Alias Verbs. The SD Management Verbs are used to allocate and deallocate Server Domain entries from the IPSOE's SD Context Table. Similarly, the IP Alias Verbs are used to allocate and deallocate IP Alias entries from the IPSOE's IP Alias Table.

Figure 21:
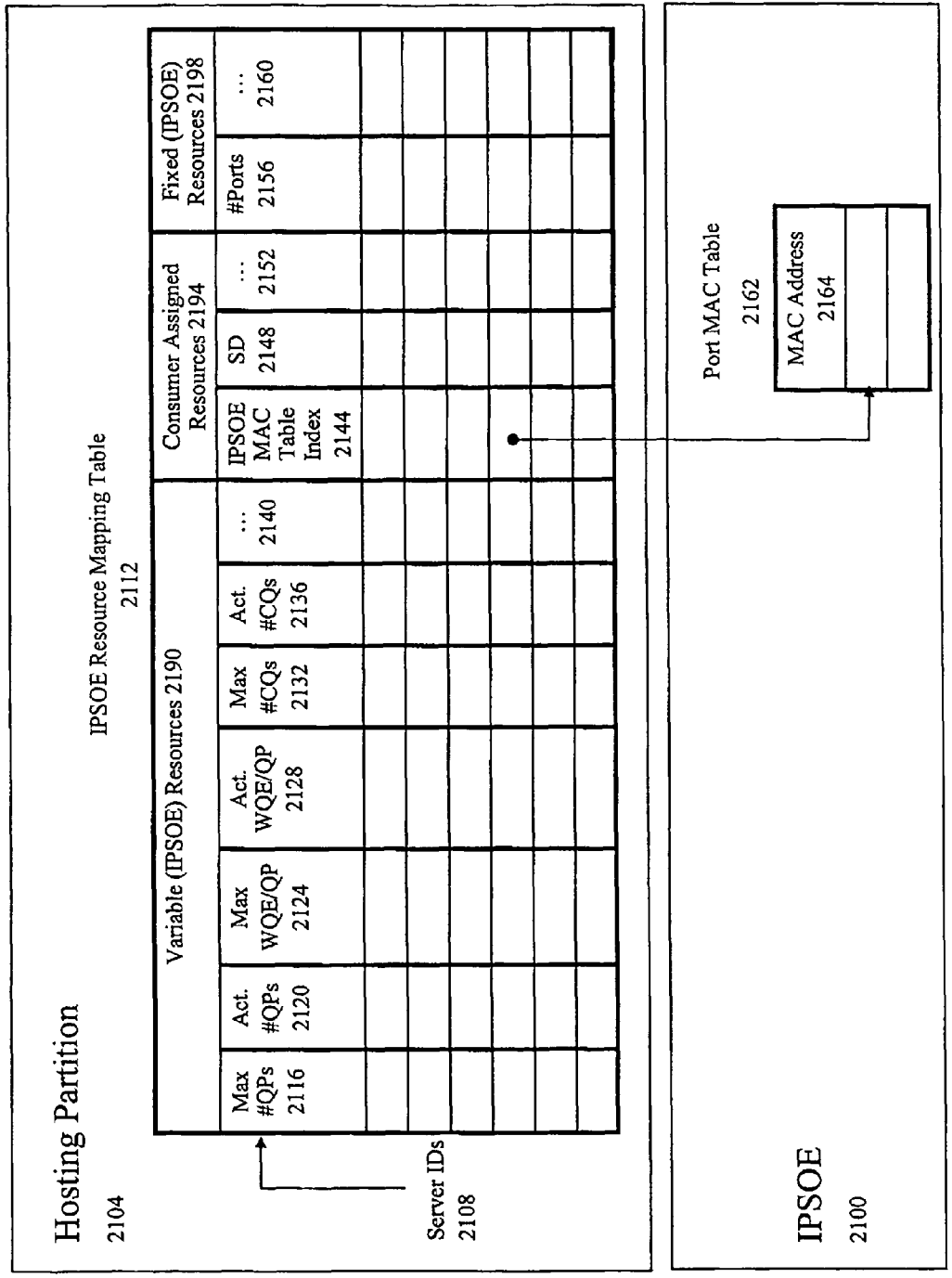
FIG. 21 is an exemplary diagram of the IPSOE MAC Table and the Hosting Partition Resource Mapping Table, which is used by the Hosting Partition to map between physical IPSOE Resources and Virtual IPSOE Resources, in accordance with the present invention.

We now turn to, FIG. 21 which is an exemplary diagram of the IPSOE MAC Table and the Hosting Partition Resource Mapping Table, which is used by the Hosting Partition to map between physical IPSOE Resources and Virtual IPSOE Resources, in accordance with the present invention. This figure depicts an IPSOE Resource Mapping Table (RMT), such as IPSOE Resource Mapping Table 2112. An IPSOE RMT is maintained in the Hosting Partition, such as HP 2104, for every IPSOE, such as IPSOE 2100, accessed through the HP. The Server Identifier (Server ID), such as Server ID 2108, of the Hosted Server is used to access the IPSOE Resources allocated to the HS through the HP.

Each row in the table contains three types of entries: Variable Resource 2190 entries, Consumer Assigned Resource 2194 entries, and Fixed Resource 2198 entries. Each Variable Resource 2190 entry type contains a Maximum and an Actual value. The Maximum value reflects the number of physical IPSOE Resources that have been allocated to the HS with a Server ID that is associated to the row. The Actual value reflects the number of physical IPSOE Resources that are currently in use by the HS with Server ID that is associated to the row. Variable resources include Number of QPs (2116 and 2120), Number of WQEs per QP (2124 and 2128), Number of CQs (2132 and 2136), Number of Memory Regions, Number of Windows, and other variable IPSOE resources.

Each Consumer Assigned Resource 2194 contains a single field that reflects the value for the resource that is associated to the HS with a Server ID that is associated to the row. Consumer Assigned Resources include the Server Domain (2148) assigned to the Server ID and the IPSOE MAC Table Index (2144) assigned to the Server ID. The IPSOE MAC Table Index 2144 and IPSOE Port Number 2156 are used to index into the IPSOE's Port Mac Table.

Finally, each Fixed Resource 2198 contains a single field that reflects the value for the resource that is associated to the HS with a Server ID that is associated to the row. For example, the IPSOE Port Number 2156 is one such Resource. The first row is a physical IPSOE row which reflects the maximum number of physical IPSOE resources and the total number that are currently in use across all HSs and the HP. For the first row: each of the Maximum Variable Resource entries reflects the maximum number of physical resources the IPSOE supports for that variable resource; each of the Actual Variable Resource entries reflects the total number of physical ISPOE resources that have already been allocated through the HP; and each of the Fixed Resource entries reflects the total number of physical resources the IPSOE supports for that fixed resource. The Consumer Assigned Resources are not used for the first row. The second row is the HPs row and reflects the IPSOE resources allocated to the HP and already used by the HP.

Figure 22:
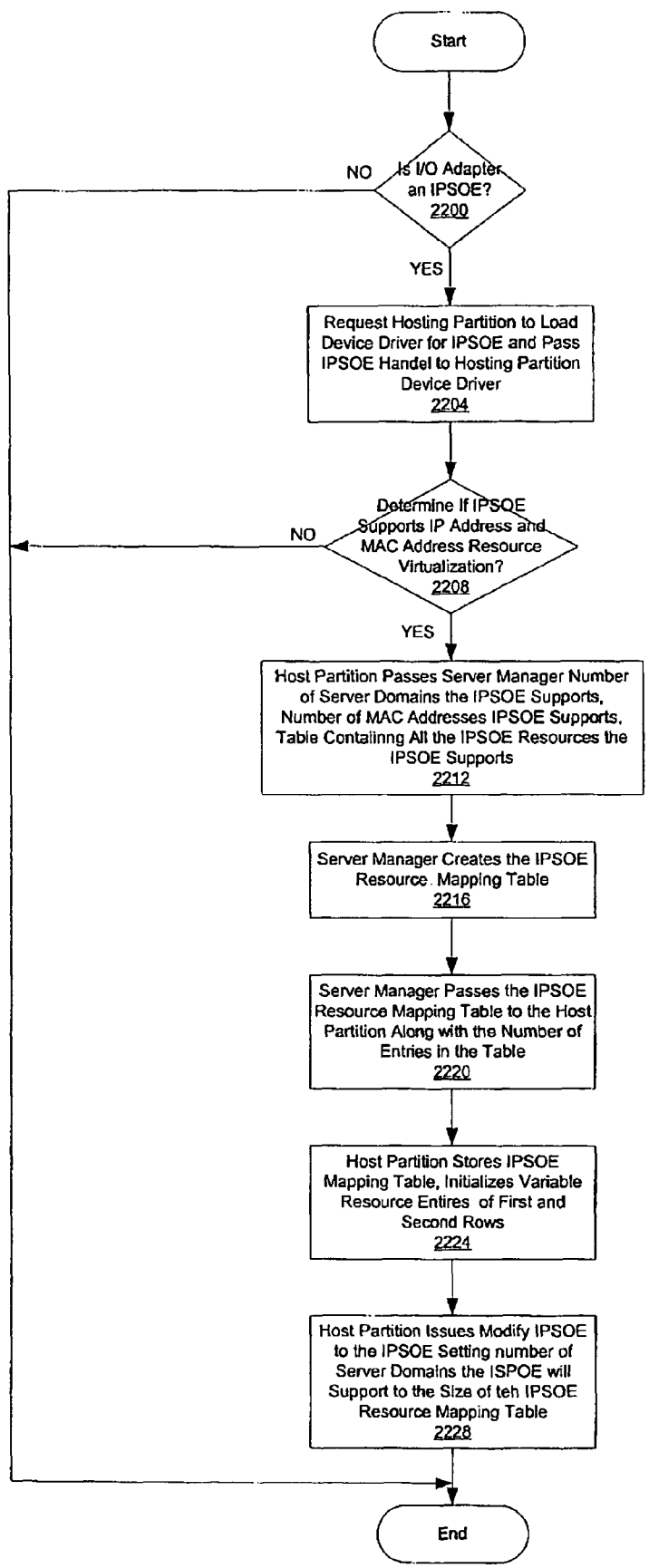
FIG. 22 is a flowchart outlining the IPSOE Virtualization Initialization mechanism in accordance with the present invention.

FIG. 22 is a flowchart outlining the IPSOE Virtualization Initialization mechanism in accordance with the present invention. Step 1 2200: Hypervisor consumer queries I/O adapter to determine if it is an IPSOE (e.g. Open IPSOE). If it is an IPSOE, it continues to Step 2. Otherwise it is not an IPSOE and the operation terminates.

Step 2 2204: Hypervisor requests Hosting Partition to load a device driver for the IPSOE (using, for example, the mechanism described in co-pending and commonly assigned U.S. patent application Ser. No. 10/132,461 (Attorney Docket No. AUS920020065US1) and passes the IPSOE Handle to the Hosting Partition Device Driver (HP).

Step 3 2208: HP performs Query IPSOE to determine if IPSOE supports IP address and MAC address resource virtualization. If it does, HP continues to step 4: 2212. Otherwise IPSOE IP address and MAC address resources are not virtualized and the operation ends.

Step 4 2212: HP passes Server Manager (SM could be a human being or a program, such as a Virtual Server Partition Manager that also runs in the Hosting Partition) the number of Server Domains the IPSOE supports, the number of MAC Addresses IPSOE supports, and a table containing all the IPSOE Resources the IPSOE supports.

Step 5 2216: Server Manager creates the IPSOE Resource Mapping Table: The Hosted Server's ID is used an index into the table. For each variable IPSOE Resource, the table contains two entries: one reflecting the maximum number allocated to the HS; and the second the actual number in use by the HS. For each consumer assigned IPSOE Resource, the table contains the value assigned by the SM. For each fixed IPSOE Resource, the table contains the value of the fixed Resource that was returned by the Query IPSOE verb.

Step 6 2220: The Server Manager passes the IPSOE Resource Mapping Table to the HP, along with the number of entries in the table.

Step 7 2224: The HP: stores the IPSOE Resource Mapping Table; initializes the Variable Resource entries of the first row by setting, for each Variable Resource, the first entry to the maximum number of resources the IPSOE supports for that variable resource and the second entry to the total number of resources that have already been allocated (which initially is just the resources allocated to the HP); and initializes the second row with the number of resources the HP will require for its own use.

Step 8 2228: The HP issues the Modify IPSOE to the IPSOE, setting the number of Server Domains (SDs) the IPSOE will support to the size of the IPSOE Resource Mapping Table.

Figure 23:
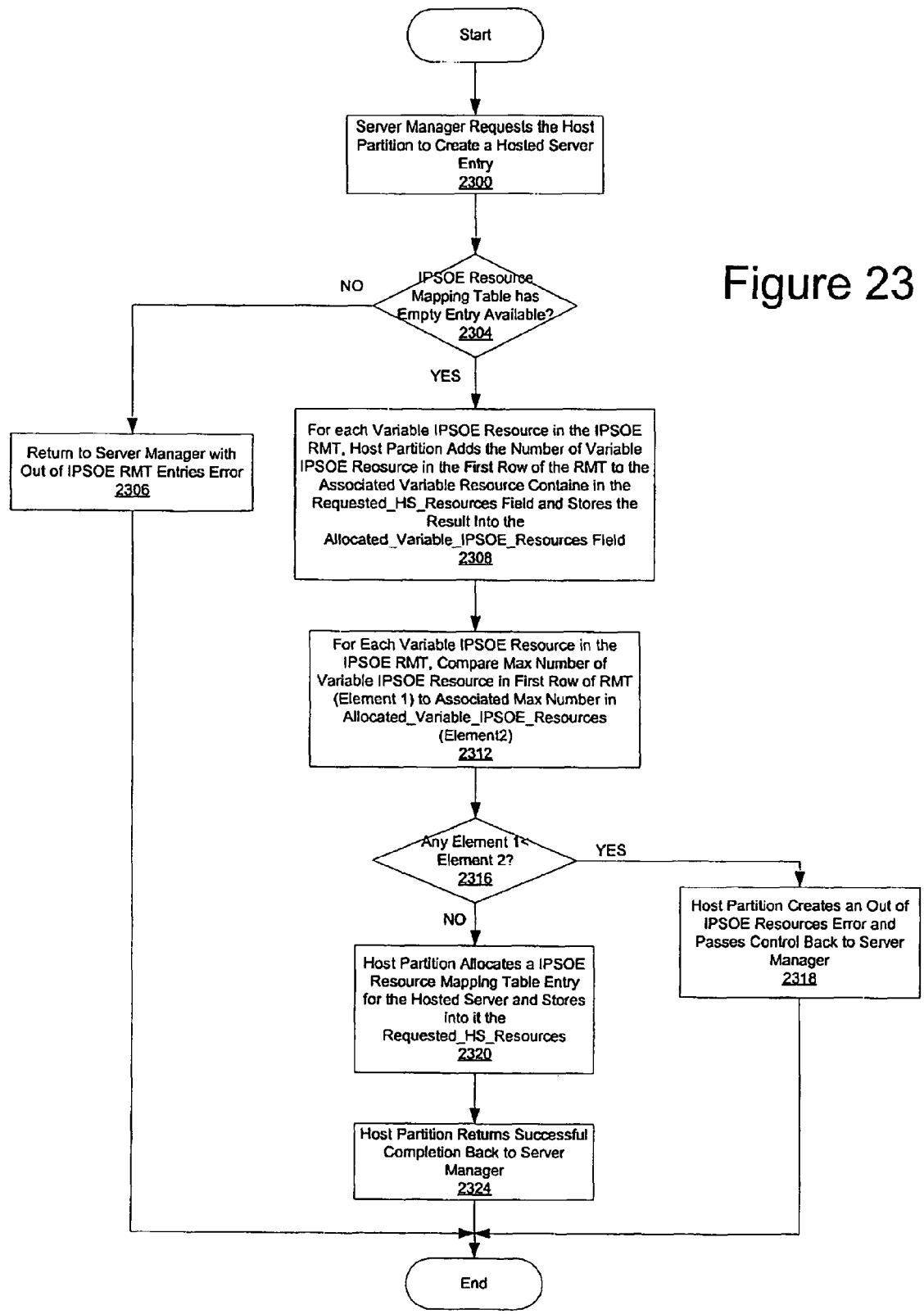
FIG. 23 is a flowchart outlining the Hosted Server Creation mechanism in accordance with the present invention.

FIG. 23 is a flowchart outlining the Hosted Server Creation mechanism in accordance with the present invention. Step 1 2300: Server Manager requests the HP to create a Hosted Server entry by passing the Maximum Number of each IPSOE Resource that is to be assigned to the Hosted Server in a field called Requested_HS_Resources.

Step 2 2304: HP checks to see if IPSOE Resource Mapping Table has an empty entry available for use. If an entry is empty, the HP continues to step 3. Otherwise it returns to the SM with an out of IPSOE RMT entries error (2306).

Step 3 2308: For each Variable IPSOE Resource in the IPSOE RMT, the HP adds the number of the Variable IPSOE Resource in the first row of the RMT to the associated Variable Resource contained in the Requested_HS_Resources field and stores the result into the Allocated_Variable_IPSOE_Resources field.

Step 4 2312: For each Variable IPSOE Resource in the IPSOE RMT, the HP compares the maximum number of the Variable IPSOE Resource in the first row of the RMT to the associated maximum number in the Allocated_Variable_IPSOE_Resources.

Step 4.1 2316: If any maximum Variable IPSOE Resource entry in the first row is less than the associated entry in the Allocated_Variable_IPSOE_Resource, the HP creates an out of IPSOE Resources error and exits the HS Creation Flowchart by passing control back to the SM (2318).

Step 4.2 2320: If each maximum Variable IPSOE Resource entry in the first row is greater than the associated entry in the Allocated_Variable_IPSOE_Resource, the HP allocates an IPSOE Resource Mapping Table entry for the Hosted Server and stores into it the Requested_HS_Resources.

Step 5 2324: HP returns successful completion back to the SM.

Figure 24:
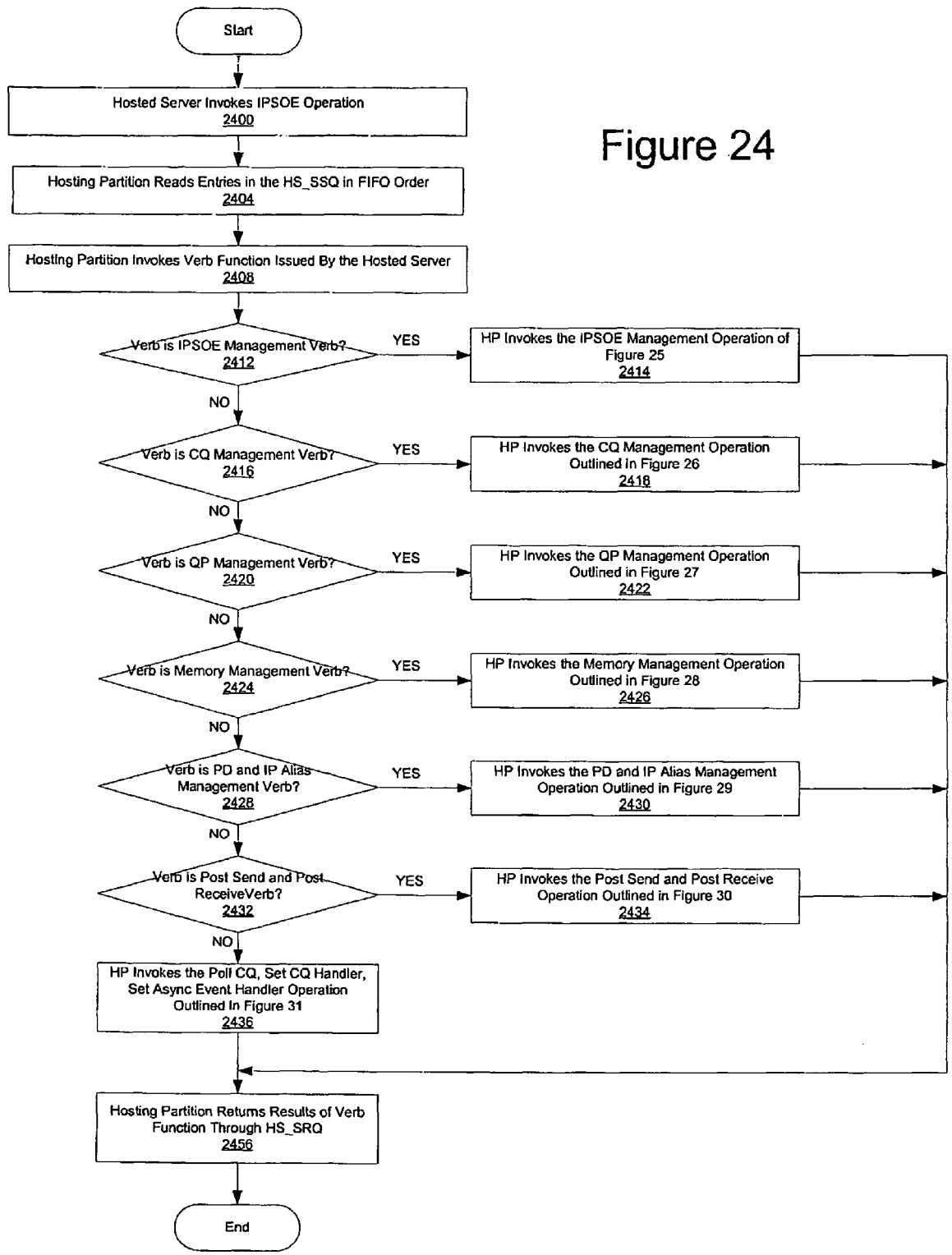
FIG. 24 is a flowchart outlining the Hosted Server Operation Traps to Hosting Partition mechanism in accordance with the present invention.

FIG. 24 is a flowchart outlining the Hosted Server Operation Traps to Hosting Partition mechanism in accordance with the present invention. Step 1 2400: Hosted Server invokes IPSOE operation by creating the verb input modifiers and passing the verb to the Hosting Partition through the HS_SSQ call.

Step 2 2404: Hosting Partition reads entries in the HS_SSQ in First-In, First-Out (FIFO) order.

Step 3 2408: The Hosting Partition invokes the verb function issued by the Hosted Server:

Step 3.1 2412: If the verb is an IPSOE Management Verb, HP invokes the IPSOE Management flowchart on FIG. 25 (2414).

Step 3.2 2416: If the verb is a CQ Management Verb, HP invokes the CQ Management flowchart on FIG. 26 (2418).

Step 3.3 2420: If the verb is an QP Management Management Verb, HP invokes the CQ Management flowchart on FIG. 27 (2422).

Step 3.4 2424: If the verb is an Memory Management Verb, HP invokes the Memory Management flowchart on FIG. 28 (2426).

Step 3.5 2428: If the verb is an PD and IP Alias Management Verb, HP invokes the PD and IP Alias Management flowchart on FIG. 29 (2430).

Step 3.6 2432: If the verb is an Post Send and Post Receive Verb, HP invokes the Post Send and Post Receive flowchart on FIG. 30 (2434).

Step 3.7 2436: If the verb is an Poll CQ, Set CQ Handler, Set Async Event Handler Verb, HP invokes the Poll CQ, Set CQ Handler, Set Async Event Handler flowchart on FIG. 31.

Step 4 2456: The Hosting Partition returns the results of the verb function through the HS_SRQ.

Figure 25:
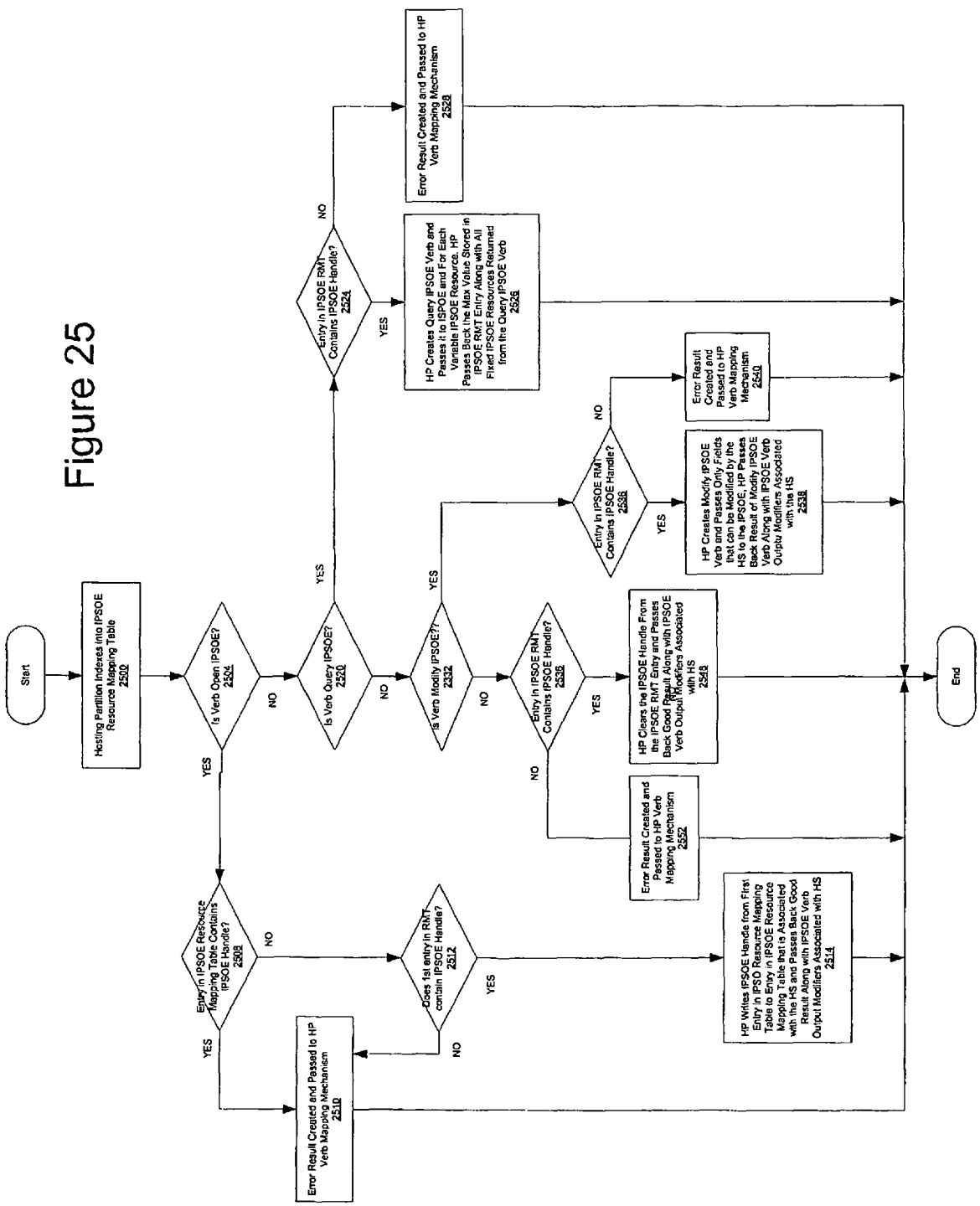
FIG. 25 is a flowchart outlining the IPSOE Management Verbs (Open, Query, Modify, and Close) mechanism in accordance with the present invention.

FIG. 25 is a flowchart outlining the IPSOE Management Verbs (Open, Query, Modify, and Close) mechanism in accordance with the present invention. Step 1 2500: The Hosting Partition (HP) uses the Hosted Server's (HS) Server ID to index into the IPSOE Resource Mapping Table.

Step 2 2504: If the verb is an Open IPSOE, the HP checks the IPSOE Resource Mapping Table entry that is associated with Hosted Server (HS) and the first entry in the IPSOE Resource Mapping Table.

Step 2.1 2508: If the entry in the IPSOE Resource Mapping Table already contains an IPSOE Handle, an error result is created and passed back to the HP verb mapping mechanism (FIG. 24) (2510).

Step 2.2 2512: If the first entry in the IPSOE Resource Mapping Table contains an IPSOE Handle and the entry in the IPSOE Resource Mapping Table does not contain an IPSOE Handle, the HP writes the IPSOE Handle from the first entry in the IPSOE Resource Mapping Table to the entry in the IPSOE Resource Mapping Table that is associated with the HS. The HP passes back a good result, along with the IPSOE verb output modifiers that are associated with the HS, to the HP verb mapping mechanism (FIG. 24) (2514).

Step 2.3 2516: If the first entry in the IPSOE Resource Mapping Table does not contain an IPSOE Handle, the HP an error result is created and passed back to the HP verb mapping mechanism (FIG. 24).

Step 3 2520: If the verb is a Query IPSOE verb, the HP checks if the entry in the IPSOE Resource Mapping Table that is associated with Hosted Server (HS) contains an IPSOE Handle (2524).

Step 3.1 2524: If the entry in the IPSOE RMT contains an IPSOE Handle, the HP creates a Query IPSOE verb and passes it to the IPSOE. For each Variable IPSOE Resource, the HP passes back the maximum value stored in the IPSOE RMT entry, along with all fixed IPSOE Resources returned from the Query IPSOE verb, to the HP verb mapping mechanism (FIG. 24) (2526).

Step 3.2 2528: If the entry in the IPSOE Resource Mapping Table does not contain an IPSOE Handle, an error result is created and passed back to the HP verb mapping mechanism (FIG. 24) (2528).

Step 4 2532: If the verb is a Modify IPSOE verb, the HP checks if the entry in the IPSOE Resource Mapping Table that is associated with Hosted Server (HS) contains an IPSOE Handle (2536).

Step 4.1 2536: If the entry in the IPSOE Resource Mapping Table contains an IPSOE Handle, the HP creates a Modify IPSOE verb and passes only fields that can be modified by the HS to the IPSOE. The HP passes back the result of the Modify IPSOE verb, along with the IPSOE verb output modifiers that are associated with the HS, to the HP verb mapping mechanism (FIG. 24) (2538).

Step 4.2 2540: If the entry in the IPSOE Resource Mapping Table does not contain an IPSOE Handle, an error result is created and passed back to the HP verb mapping mechanism (FIG. 24).

Step 5 2544: If the verb is a Close IPSOE verb, the HP checks if the entry in the IPSOE Resource Mapping Table that is associated with Hosted Server (HS) contains an IPSOE Handle.

Step 5.1 2548: If the entry contains an IPSOE Handle, the HP: clears the IPSOE handle from the IPSOE RMT entry; and passes back a good result, along with the IPSOE verb output modifiers that are associated with the HS, to the HP verb mapping mechanism (FIG. 24).

Step 5.2 2552: If the entry does not contain an IPSOE Handle, an error result is created and passed back to the HP verb mapping mechanism (FIG. 24).

FIG. 26 is a flowchart outlining the CQ Management Verbs (Create, Query, Modify, and Destroy) mechanism in accordance with the present invention. Step 1 2600: If the verb is a Create CQ, the HP retrieves the Maximum Number of CQs and Actual Number of CQs from the IPSOE Resource Mapping Table entry that is associated with Hosted Server (HS) (2602).

Step 1.1 2604: If Maximum Number of CQs=Actual Number of CQs, no more CQs are available for the HS and an error result is created-and-passed back to the HP verb mapping mechanism (FIG. 24) (2606).

Step 1.2 2608: If Maximum Number of CQs<Actual Number of CQs, the HP: increases the Actual Number of CQs by 1 and stores the results in the Actual Number of CQs cell of the IPSOE Resource Mapping Table entry that is associated with Hosted Server (HS); builds a Create CQ verb using the input modifiers passed by the HS and the SD associated with the HS (from the IPSOE RMT entry that is associated with the HS); passes the Create CQ verb to the IPSOE; and passes back the Create CQ IPSOE verb result, along with the IPSOE verb output modifiers that are associated with the HS, to the HP verb mapping mechanism (FIG. 24).

Step 2 2612: If the verb is a Query CQ verb, the HP: builds the Query CQ verb; passes the Query CQ verb to the IPSOE; and passes back the Query CQ verb result from the IPSOE, along with the IPSOE verb output modifiers that are associated with the HS, to the HP verb mapping mechanism (FIG. 24) (2614).

Step 3 2616: If the verb is a Modify CQ verb, the HP: builds the Modify CQ verb; passes the Modify CQ verb to the IPSOE; and passes back the Modify CQ verb result from the IPSOE, along with the IPSOE verb output modifiers that are associated with the HS, to the HP verb mapping mechanism (FIG. 24)(2618).

Step 4 2620: If the verb is a Destroy CQ verb, the HP: builds the Destroy CQ verb; passes the Destroy CQ verb to the IPSOE; and passes back the Destroy CQ verb result from the IPSOE, along with the IPSOE verb output modifiers that are associated with the HS, to the HP verb mapping mechanism (FIG. 24).

FIG. 27 is a flowchart outlining the QP Management Verbs (Create, Query, Modify, and Destroy) mechanism in accordance with the present invention. Step 1 2700: If the verb is a Create QP, the HP retrieves the Maximum Number of QPs and Actual Number of QPs from the IPSOE Resource Mapping Table entry that is associated with Hosted Server (HS) (2702).

Step 1.1 2704: If Maximum Number of QPs=Actual Number of QPs, no more QPs are available for the HS and an error result is created and passed back to the HP verb mapping mechanism (FIG. 24) (2706).

Step 1.2 2708: If Maximum Number of QPs<Actual Number of QPs, the HP: increases the Actual Number of QPs by 1 and stores the results in the Actual Number of QPs cell of the IPSOE Resource Mapping Table entry that is associated with Hosted Server (HS); builds a Create QP verb using the input modifiers passed by the HS, the IP Virtual Address, the SD associated with the HS (from the IPSOE RMT entry that is associated with the HS), and the MAC Address associated with the HS (from the IPSOE RMT entry that is associated with the HS); passes the Create QP verb to the IPSOE; and passes back the Create QP IPSOE verb result, along with the IPSOE verb output modifiers that are associated with the HS, to the HP verb mapping mechanism (FIG. 24) (2708).

Step 2 2712: If the verb is a Query QP verb, the HP: builds the Query QP verb; passes the Query QP verb to the IPSOE; and passes back the Query QP verb result from the IPSOE, along with the IPSOE verb output modifiers that are associated with the HS, to the HP verb mapping mechanism (FIG. 24) (2714).

Step 3 2716: If the verb is a Modify QP verb, the HP: builds the Modify QP verb; passes the Modify QP verb to the IPSOE; and passes back the Modify QP verb result from the IPSOE, along with the IPSOE verb output modifiers that are associated with the HS, to the HP verb mapping mechanism (FIG. 24) (2718).

Step 4 2720: If the verb is a Destroy QP verb, the HP: builds the Destroy QP verb; passes the Destroy QP verb to the IPSOE; and passes back the Destroy QP verb result from the IPSOE, along with the IPSOE verb output modifiers that are associated with the HS, to the HP verb mapping mechanism (FIG. 24).

FIG. 28 is a flowchart outlining the Memory Management Verbs (All Registers, All Reregisters, All Allocates, All Deregisters) mechanism in accordance with the present invention. Step 1 2800: If the verb is any type of Register verb, the HP retrieves the Maximum Number of Memory Regions and Actual Number of Memory Regions (MR) from the IPSOE Resource Mapping Table entry that is associated with Hosted Server (HS) (2802).

Step 1.1 2804: If Maximum Number of Memory Regions=Actual Number of Memory Regions, no more MRs are available for the HS and an error result is created and passed back to the HP verb mapping mechanism (FIG. 24) (2806).

Step 1.2 2808: If Maximum Number of MRs<Actual Number of MRs, the HP: increases the Actual Number of MRs by 1 and stores the results in the Actual Number of MRs cell of the IPSOE Resource Mapping Table entry that is associated with HS; builds a Register MR verb using the input modifiers passed by the HS and the SD associated with the HS (from the IPSOE RMT entry that is associated with the HS); passes the Register MR verb to the IPSOE; and passes back the Register MR verb result from the IPSOE, along with the IPSOE verb output modifiers that are associated with the HS, to the HP verb mapping mechanism (FIG. 24).

Step 2 2812: If the verb is any type of Reregister verb, the HP: builds a Reregister MR verb using the input modifiers passed by the HS and the SD associated with the HS (from the IPSOE RMT entry that is associated with the HS); passes the Reregister MR verb to the IPSOE; and passes back the Reregister MR verb result from the IPSOE, along with the IPSOE verb output modifiers that are associated with the HS, to the HP verb mapping mechanism (FIG. 24) (2814).

Step 3 2816: If the verb is any type of Allocate verb, the HP: increases the Actual Number of MRs by 1 and stores the results in the Actual Number of MRs cell of the IPSOE Resource Mapping Table entry that is associated with Hosted Server (HS); builds an Allocate MR verb using the input modifiers passed by the HS and the SD associated with the HS (from the IPSOE RMT entry that is associated with the HS); passes the Allocate MR verb to the IPSOE; and passes back the Allocate MR verb result from the IPSOE, along with the IPSOE verb output modifiers that are associated with the HS, to the HP verb mapping mechanism (FIG. 24) (2818).

Step 4 2820: If the verb is any type of Deregister verb, the HP builds a Deregister MR verb using the input modifiers passed by the HS and the SD associated with the HS (from the IPSOE RMT entry that is associated with the HS); passes the Deregister MR verb to the IPSOE.

Step 4.1 2824: If the Deregister MR was successful, the HP: decreases the Actual Number of MRs by 1 and stores the results in the Actual Number of MRs cell of the IPSOE Resource Mapping Table entry that is associated with Hosted Server (HS); and passes back the Deregister MR verb result from the IPSOE, along with the IPSOE verb output modifiers that are associated with the HS, to the HP verb mapping mechanism (FIG. 24) (2826).

Step 4.2 2828: If the Deregister MR was unsuccessful, the HP passes back the erroneous verb result from the IPSOE, along with the IPSOE verb output modifiers that are associated with the HS, to the HP verb mapping mechanism (FIG. 24).

Figure 29:
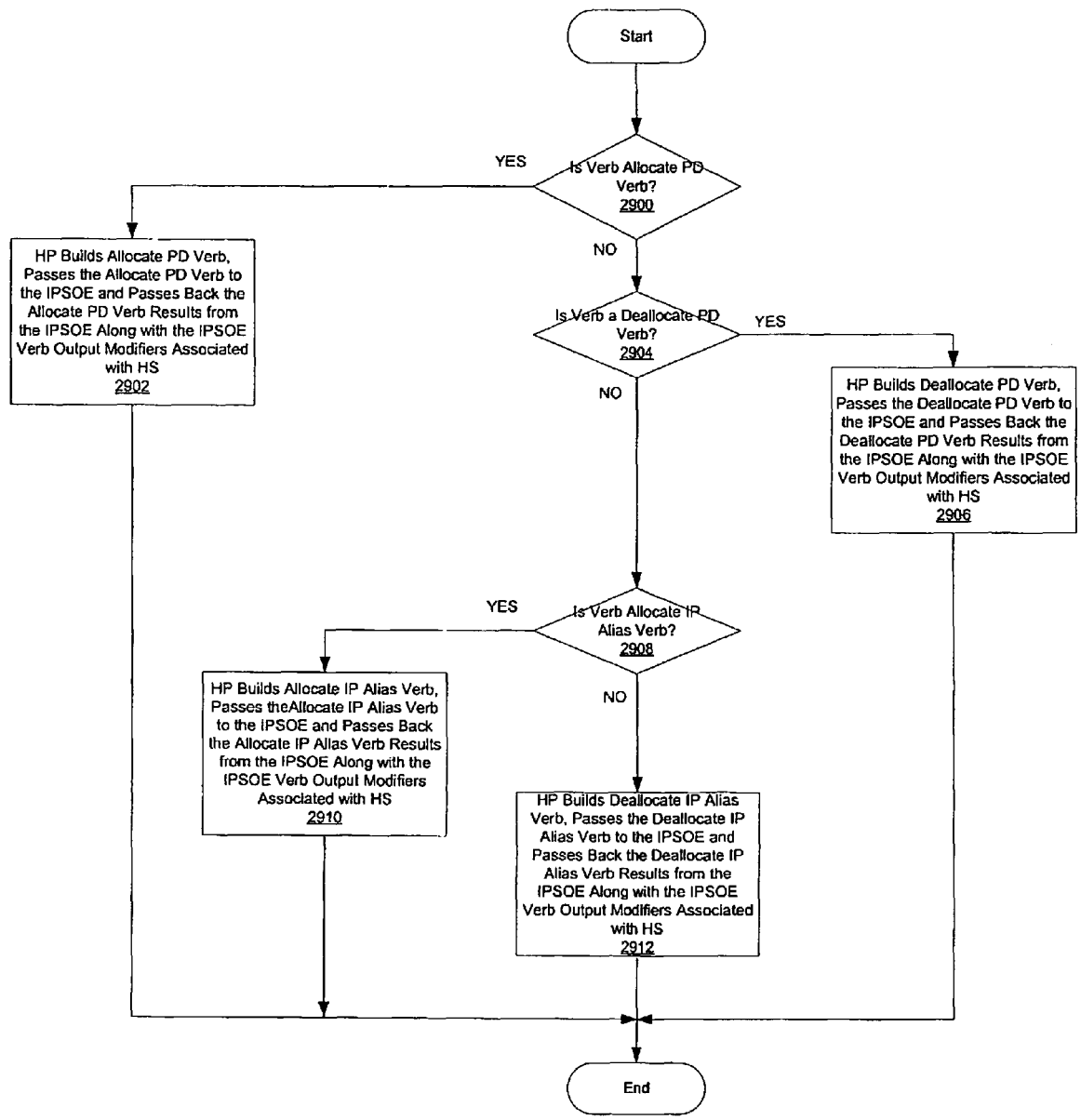
FIG. 29 is a flowchart outlining the PD and IP Address Alias Management Verbs (Allocate PD, Deallocate PD) mechanism in accordance with the present invention.

FIG. 29 is a flowchart outlining the PD and IP Alias Management Verbs (Allocate PD, Deallocate PD) mechanism in accordance with the present invention. Step 1 2900: If the verb is an Allocate PD verb, the HP builds an Allocate PD verb using the input modifiers passed by the HS; passes the Allocate PD verb to the IPSOE; and passes back the Allocate PD verb result from the IPSOE, along with the IPSOE verb output modifiers that are associated with the HS, to the HP verb mapping mechanism (FIG. 24) (2902).

Step 2 2904: If the verb is an Deallocate PD verb, the HP builds an Deallocate PD verb using the input modifiers passed by the HS; passes the Deallocate PD verb to the IPSOE; and passes back the Deallocate PD verb result from the IPSOE, along with the IPSOE verb output modifiers that are associated with the HS, to the HP verb mapping mechanism (FIG. 24) (2906).

Step 3 2908: If the verb is an Allocate IP Alias verb, the HP builds an Allocate IP Alias verb using the input modifiers passed by the HS; passes the Allocate IP Alias verb to the IPSOE; and passes back the Allocate IP Alias verb result from the IPSOE, along with the IPSOE verb output modifiers that are associated with the HS, to the HP verb mapping mechanism (FIG. 24) (2910).

Step 4 2912: If the verb is an Deallocate IP Alias verb, the HP builds an Deallocate IP Alias verb using the input modifiers passed by the HS; passes the Deallocate IP Alias verb to the IPSOE; and passes back the Deallocate IP Alias verb result from the IPSOE, along with the IPSOE verb output modifiers that are associated with the HS, to the HP verb mapping mechanism (FIG. 24).

FIG. 30 is a flowchart outlining the Post Send and Post Receive Verbs mechanism in accordance with the present invention. Step 1 3000: If the verb is a Post Send verb, the HP: validates the input modifiers associated with the Post Send.

Step 1.1 3004: If all the modifiers are valid, the HP continues to step 1.3.

Step 1.2 3008: If any of the modifiers is invalid, the HP passes back an error immediate verb result, with the specific error, to the HP verb mapping mechanism (FIG. 24).

Step 1.3 3012: If it is a Send, Raw Send, TOE Send, or Send with SE verb, the HP: creates, for each GL MR, a Redirected_DMA_TCE_entry in the host Task Control Element (TCE) table (for a description of the TCE mechanism described see co-pending and commonly assigned U.S. patent application Ser. No. 10/132,461 (Attorney Docket No. AUS920020065US1)) with the access rights set to read; builds the Post Send verb using the input modifiers passed by the HS; passes the Post Send verb to the IPSOE; and passes back a good immediate verb result to the HP verb mapping mechanism (FIG. 24) (3014).

Step 1.4 3016: If it is any Send with Register MR verb, the HP: creates, for each Gather List (GL) MR, a Redirected_DMA_TCE_entry in the host TCE table with the access rights set to the MR access rights; builds the Post Send verb using the input modifiers passed by the HS; passes the Post Send verb to the IPSOE; and passes back a good immediate verb result to the HP verb mapping mechanism (FIG. 24) (3018).

Step 1.5 3020: If it is a Bind Memory Window verb, the HP: creates, for each GL MR, a Redirected_DMA_TCE_entry in the host TCE table with the access rights set to the MW access rights; builds the Post Send verb using the input modifiers passed by the HS; passes the Post Send verb to the IPSOE; and passes back a good immediate verb result to the HP verb mapping mechanism (FIG. 24) (3022).

Step 1.6 3024: If it is any type of RDMA Write verb, the HP: creates, for each GL MR, a Redirected_DMA_TCE_entry in the host TCE table with the access rights set to read; builds the Post Send verb using the input modifiers passed by the HS; passes the Post Send verb to the IPSOE; and passes back a good immediate verb result to the HP verb mapping mechanism (FIG. 24) (3026).

Step 1.7 3028: If it is any type of RDMA Read verb, the HP: builds the Post Send verb using the input modifiers passed by the HS; passes the Post Send verb to the IPSOE; and passes back a good immediate verb result to the HP verb mapping mechanism (FIG. 24).

Step 2 3032: If the verb is a Post Receive (includes RNIC QP, Raw QP, and TOE QP Receives) verb, the HP: validates the input modifiers associated with the Post Receive verb.

Step 2.1 3036: If all the modifiers are valid, the HP continues to step 2.3.

Step 2.2 3040: If any of the modifiers is invalid, the HP passes back an error immediate verb result, with the specific error, to the HP verb mapping mechanism (FIG. 24).

Step 2.3 3044: The HP: creates, for each Scatter List (SL) MR, a Redirected_DMA_TCE_entry in the host TCE table with the access rights set to write; builds the Post Receive verb using the input modifiers passed by the HS; passes the Post Receive verb to the IPSOE; and passes back a good immediate verb result to the HP verb mapping mechanism (FIG. 24).

FIG. 31 is a flowchart outlining the Poll CQ, Set CQ Handler, Set Async Event Handler Verbs mechanism in accordance with the present invention. Step 1 3100: If the verb is a Poll CQ verb, the HP: validates the input modifiers associated with the Poll CQ (3102).

Step 1.1 3104: If all the modifiers are valid, the HP continues to step 1.3.

Step 1.2 3108: If any of the modifiers is invalid, the HP passes back an error immediate verb result, with the specific error, to the HP verb mapping mechanism (FIG. 24).

Step 1.3 3112: If there are no Work Completions available on the CQ (3110), the HP passes back the no IPSOE WC to the HP verb mapping mechanism (FIG. 24) (3112).

Step 1.4 3116: If the Work Completion is associated with a Send, Raw Send, TOE Send, Send with SE verb, any Send with Register MR, or RDMA Write (3114), the HP: destroys, for each GL MR, the Redirected_DMA_TCE_entry in the host TCE table that was created during the Post Send verb invocation; and passes back the IPSOE WC to the HP verb mapping mechanism (FIG. 24) (3116).

Step 1.5 3120: If the Work Completion is associated with a Bind Memory Window or RDMA Read (3118), the HP passes back the IPSOE WC to the HP verb mapping mechanism (FIG. 24) (3120).

Step 1.6 3124: If the Work Completion is associated with a Receive (includes RNIC QP, Raw QP, and TOE QP Receives), the HP: destroys, for each Scatter List (SL) MR, the Redirected_DMA_TCE_entry in the host TCE table that was created during the Post Receive verb invocation; and passes back the IPSOE WC to the HP verb mapping mechanism (FIG. 24).

Step 2 3128: If it is a Set CQ Handler verb, the HP: validates the input modifiers associated with the Post Receive verb.

Step 2.1 3132: If all the modifiers are valid, the HP continues to step 2.3.

Step 2.2 3136: If any of the modifiers is invalid, the HP passes back an error immediate verb result, with the specific error, to the HP verb mapping mechanism (FIG. 24).

Step 2.3 3138: If a CQ. Handler was already created for the HS, the HP: passes back an error verb result to the HP verb mapping mechanism (FIG. 24) (3136).

Step 2.4 3144: If a CQ Handler was not already created for the HS, the HP: creates a CQ Handler for the HS and passes back a good verb result to the HP verb mapping mechanism (FIG. 24).

Step 3 3148: If it is a Set Async Handler verb, the HP: validates the input modifiers associated with the Post Receive verb.

Step 3.1 3152: If all the modifiers are valid, the HP continues to step 2.3.

Step 3.2 3156: If any of the modifiers is invalid, the HP passes back an error immediate verb result, with the specific error, to the HP verb mapping mechanism (FIG. 24). If a Async Event Handler was already created for the HS, the HP: passes back an error verb result to the HP verb mapping mechanism (FIG. 24).

Step 3.4 3164: If an Async Event Handler was not already created for the HS, the HP: creates a CQ Handler for the HS and passes back a good verb result to the HP verb mapping mechanism (FIG. 24).

FIG. 32 is a flowchart outlining the IPSOE Incoming Ethernet Frame Processing mechanism in accordance with the present invention. Step 1 3200: The IPSOE validates that the IP Alias Table contains an entry with an IP address that matches the incoming Ethernet Frame's Destination IP Address. This step can be combined with step 3.

Step 2 3204: The network and transport headers of the incoming Ethernet Frame are checked to determine the type of QP used in the IPSOE.

Step 3 3208: If the incoming Ethernet Frame does not contain TCP/IP headers or contains a TCP/IP header that has a quintuple (Transport Type, Source IP Address, Destination IP Address, Source Port Number, and Destination Port Number) which is associated with a Raw or TOE QP, the IPSOE determines if the QP's Receive Work Queue (RWQ) has a Work Queue Element (WQE) that can be used to receive the incoming frame (3210).

Step 2.1 3212: If the RWQ does not have a WQE available, the IPSOE keeps the frame in the resegmentation buffer or drops it and exits this flowchart.

Step 2.2 3216: If the RWQ has a WQE available, the IPSOE places the frame in the WQE and exits this flowchart.

Step 3 3220: If the incoming Ethernet Frame contains a TCP/IP quintuple (Transport Type, Source IP Address, Destination IP Address, Source Port Number, and Destination Port Number) that is associated with a RNIC QP, the IPSOE determines the type of RNIC Message.

Step 3.1 3224: If the incoming message is any type of Send, the IPSOE determines if the QP's Receive Work Queue (RWQ) has a Work Queue Element (WQE) that can be used to receive the incoming frame (3226).

Step 3.1.1 3228: If the RWQ does not have a WQE available, the IPSOE keeps the frame in the resegmentation buffer or drops it.

Step 3.1.2 3232: If the RWQ has a WQE available, the IPSOE places the frame in the WQE.

Step 3.1.4 3240: If incoming Message is a Send with Invalidate or Send with Invalidate and SE, and the Memory TPT referenced by the STag is associated with the QP that is associated QP that is associated with the incoming TCP Segment, then the IPSOE invalidates the STag associated with the Message.

Step 3.1.4 3252: If the incoming message is a Send with SE or a Send with Invalidate and SE, generates a CQ Event, and exits this flowchart.

Step 3.2.1 3260: If the incoming message is any type of RDMA, the IPSOE performs the following: Uses the index portion of the STag to reference the Memory TPT entry associated with the incoming RDMA Write and performs the traditional access controls (e.g. validates that the Protection Domain stored in the Memory TPT entry matches the Protection Domain Stored in the QP Context). If this access is not valid, the IPSOE performs the necessary error processing and exits this flowchart.

Step 3.2.2 3264: The IPSOE determines if the Server Domain (SD) stored in the Memory TPT entry matches the SD stored in the QP Context. If it matches, the IPSOE performs the RDMA operation and exits this flowchart. If it does not match, the IPSOE performs the necessary error processing and exits this flowchart.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing a work queue, comprising:
   receiving a work request;
   creating a receive work queue entry in a receive work queue in response to receipt of the work request;
   sending a notification to an Internet Protocol Suite Offload Engine (IPSOE) notifying the IPSOE of the creation of the receive work queue entry;
   processing a completion queue entry in a completion queue in response to receiving a notification that the completion queue entry has been created by the IPSOE in response to processing of the receive work queue entry; and
   monitoring, by an upper level protocol, a number of entries available in the receive work queue to prevent the upper level protocol from overwriting valid receive work queue entries in the receive work queue, wherein the IPSOE monitors a number of entries available in the completion queue to prevent the IPSOE from overwriting valid completion queue entries in the completion queue, and wherein the upper level protocol increases a size of the completion queue by adding entry spaces and notifies the IPSOE of how many entry spaces are added to the completion queue in response to no entry spaces being available in the completion queue.

2. The method of claim 1, wherein the completion queue entry in the completion queue includes a work request ID that associates the receive work queue entry in the receive work queue to the completion queue entry in the completion queue.

3. The method of claim 1, wherein the receive work queue entry is created by an upper layer protocol library in response to a receiving the work request.

4. The method of claim 1, further comprising:
provide a Selective Acknowledgment (SACK) table for storing information regarding incoming data packets destined for a receive queue of the IPSOE and for generating TCP/IP SACKs.

5. The method of claim 1, wherein the IPSOE is shared between a plurality of virtual hosts on a single physical host device.

6. An apparatus in a data processing system, for managing a work queue, comprising:
means for receiving a work request;
means for creating a receive work queue entry in a receive work queue in response to receipt of the work request;
means for sending a notification to an Internet Protocol Suite Offload Engine (IPSOE) notifying the IPSOE of the creation of the receive work queue entry;
means for processing a completion queue entry in a completion queue in response to receiving a notification that the completion queue entry has been created by the IPSOE in response to processing of the receive work queue entry; and
means for monitoring, by an upper level protocol, a number of entries available in the receive work queue to prevent the upper level protocol from overwriting valid receive work queue entries in the receive work queue, wherein the IPSOE monitors a number of entries available in the completion queue to prevent the IPSOE from overwriting valid completion queue entries in the completion queue, and wherein the upper level protocol increases a size of the completion queue by adding entry spaces and notifies the IPSOE of how many entry spaces are added to the completion queue in response to no entry spaces being available in the completion queue.

7. The apparatus of claim 6, wherein the completion queue entry in the completion queue includes a work request ID that associates the receive work queue entry in the receive work queue to the completion queue entry in the completion queue.

8. The apparatus of claim 6, wherein the receive work queue entry is created by an upper layer protocol library in response to a receiving the work request.

9. The apparatus of claim 6, further comprising:
means for providing a Selective Acknowledgment (SACK) table for storing information regarding incoming data packets destined for a receive queue of the IPSOE and for generating TCP/IP SACKs.

10. The apparatus of claim 6, wherein the IPSOE is shared between a plurality of virtual hosts on a single physical host device.

11. A computer program product in a non-transitory computer readable medium in a data processing system, for managing a work queue, comprising:
first instructions for receiving a work request;
second instructions for creating a receive work queue entry in a receive work queue in response to receipt of the work request;
third instructions for sending a notification to an Internet Protocol Suite Offload Engine (IPSOE) notifying the IPSOE of the creation of the receive work queue entry;
fourth instructions for processing a completion queue entry in a completion queue in response to receiving a notification that the completion queue entry has been created by the IPSOE in response to processing of the receive work queue entry; and
fifth instructions for monitoring, by an upper level protocol, a number of entries available in the receive work queue to prevent the upper level protocol from overwriting valid receive work queue entries in the receive work queue, wherein the IPSOE monitors a number of entries available in the completion queue to prevent the IPSOE from overwriting valid completion queue entries in the completion queue, and wherein the upper level protocol increases a size of the completion queue by adding entry spaces and notifies the IPSOE of how many entry spaces are added to the completion queue in response to no entry spaces being available in the completion queue.

12. The computer program product of claim 11, wherein the completion queue entry in the completion queue includes a work request ID that associates the receive work queue entry in the receive work queue to the completion queue entry in the completion queue.

13. The computer program product of claim 11, wherein the receive work queue entry is created by an upper layer protocol library in response to a receiving the work request.

14. The computer program product of claim 11, further comprising:
sixth instructions for providing a Selective Acknowledgment (SACK) table for storing information regarding incoming data packets destined for a receive queue of the IPSOE and for generating TCP/IP SACKs.

15. The computer program product of claim 11, wherein the IPSOE is shared between a plurality of virtual hosts on a single physical host device.

\* \* \* \* \*